United States Patent
Yasuda et al.

(10) Patent No.: US 10,499,442 B2
(45) Date of Patent: Dec. 3, 2019

(54) METHOD AND SYSTEM FOR COMMUNICATION BETWEEN GROUPS IN WIRELESS COMMUNICATION NETWORK

(71) Applicant: NEC Corporation, Tokyo (JP)

(72) Inventors: Masato Yasuda, Tokyo (JP); Prakash Chaki, Tokyo (JP); Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 15/503,336

(22) PCT Filed: Aug. 10, 2015

(86) PCT No.: PCT/JP2015/004006
§ 371 (c)(1),
(2) Date: Feb. 10, 2017

(87) PCT Pub. No.: WO2016/024399
PCT Pub. Date: Feb. 18, 2016

(65) Prior Publication Data
US 2017/0245122 A1 Aug. 24, 2017

(30) Foreign Application Priority Data
Aug. 12, 2014 (JP) .................... 2014-164034

(51) Int. Cl.
*H04W 76/14* (2018.01)
*H04W 4/08* (2009.01)
(Continued)

(52) U.S. Cl.
CPC .......... *H04W 76/14* (2018.02); *H04L 67/104* (2013.01); *H04M 11/00* (2013.01); *H04W 4/08* (2013.01);
(Continued)

(58) Field of Classification Search
CPC ............. H04W 36/00; H04W 36/0009; H04W 36/0011; H04W 36/0022; H04W 36/0027;
(Continued)

(56) References Cited

U.S. PATENT DOCUMENTS 7,194,002 B2 * 3/2007 Zhang ................... H04L 12/185
370/338
2007/0021137 A1 * 1/2007 Kokkonen ............ H04L 41/042
455/518
(Continued)

FOREIGN PATENT DOCUMENTS

EP 2323460 A2 5/2011
JP 2007-336360 A 12/2007
(Continued)

OTHER PUBLICATIONS

Extended European Search Report issued in European Patent Application No. 15831898.0, dated Feb. 8, 2018, 8 pages.
(Continued)

*Primary Examiner* — Ashley Shivers
(74) *Attorney, Agent, or Firm* — Wilmer Cutler Pickering Hale and Dorr LLP

(57) ABSTRACT

A communication method and a system are provided that make it possible to transfer information between groups. The communication method is a communication method in a wireless communication network including a plurality of nodes that can form a peer-to-peer group, wherein an owner node operating as an access point in one group selects one or a plurality of client nodes within this group as delivery nodes, the delivery node disconnects from the group and connects to another group that is present in vicinity, and information is transferred between the delivery node and an owner node of the another group.

20 Claims, 23 Drawing Sheets

FIRST EXEMPLARY EMBODIMENT

(51) Int. Cl.
*H04W 84/20* (2009.01)
*H04L 29/08* (2006.01)
*H04W 76/10* (2018.01)
*H04M 11/00* (2006.01)
*H04W 84/22* (2009.01)
*H04W 88/04* (2009.01)
*H04W 92/18* (2009.01)

(52) U.S. Cl.
CPC ............ *H04W 76/10* (2018.02); *H04W 84/20* (2013.01); *H04W 84/22* (2013.01); *H04W 88/04* (2013.01); *H04W 92/18* (2013.01)

(58) Field of Classification Search
CPC ......... H04W 36/0033; H04W 36/0055; H04W 36/04; H04W 36/08
See application file for complete search history.

(56) References Cited

U.S. PATENT DOCUMENTS

| | | | | |
|---|---|---|---|---|
| 2009/0172179 | A1* | 7/2009 | Miao | H04L 65/602 709/231 |
| 2011/0116415 | A1 | 5/2011 | Naito et al. | |
| 2011/0149816 | A1 | 6/2011 | Saito et al. | |
| 2011/0282989 | A1* | 11/2011 | Geirhofer | H04W 8/005 709/224 |
| 2011/0314160 | A1* | 12/2011 | Turner | G06F 9/5072 709/226 |
| 2013/0080925 | A1* | 3/2013 | Hortsmann | H04L 12/1813 715/753 |
| 2013/0294287 | A1 | 11/2013 | Naito et al. | |
| 2014/0120878 | A1* | 5/2014 | Sato | H04L 63/104 455/411 |
| 2014/0177472 | A1* | 6/2014 | Halasz | H04W 28/021 370/255 |
| 2016/0234661 | A1* | 8/2016 | Narasimhan | H04W 4/08 |

FOREIGN PATENT DOCUMENTS

| | | |
|---|---|---|
| JP | 2011-124980 A | 6/2011 |
| WO | WO-2014/099340 A2 | 6/2014 |
| WO | WO-2014/103656 A1 | 7/2014 |

OTHER PUBLICATIONS

Japanese Notification of Reasons for Refusal issued in Japanese Patent Application No. 2016-542503, dated Apr. 9, 2019, 9 pages.
Prakash Chaki et al., "Dynamic Topology Reformation for Content Dissemination in Wi-Fi Peer-to-Peer Networks", Proceedings of the 2015 IEICE General Conference No. 2, Mar. 2015, pp. S-108 and S-109 (2 pages).
Wi-Fi Alliance Technical Committee PSP Task Group, Wi-Fi Peer-to-Peer (P2P) Technical Specification Version 1.1, 2010, (pp. 1-159).
International Search Report corresponding to PCT/JP2015/004006 dated Nov. 2, 2015 (5 pages).

* cited by examiner

FIG. 1 FIRST EXEMPLARY EMBODIMENT

SECOND EXEMPLARY EMBODIMENT

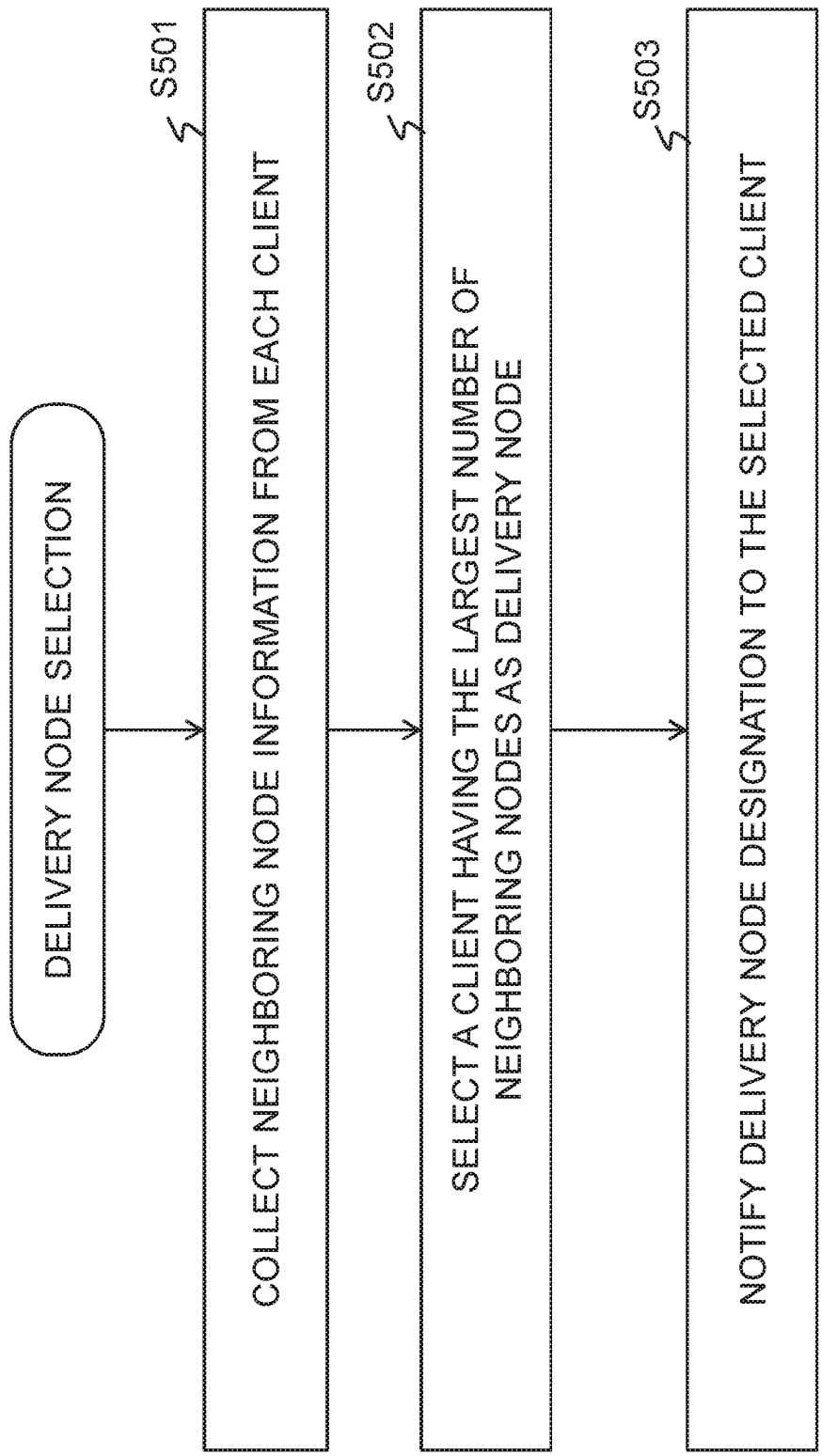

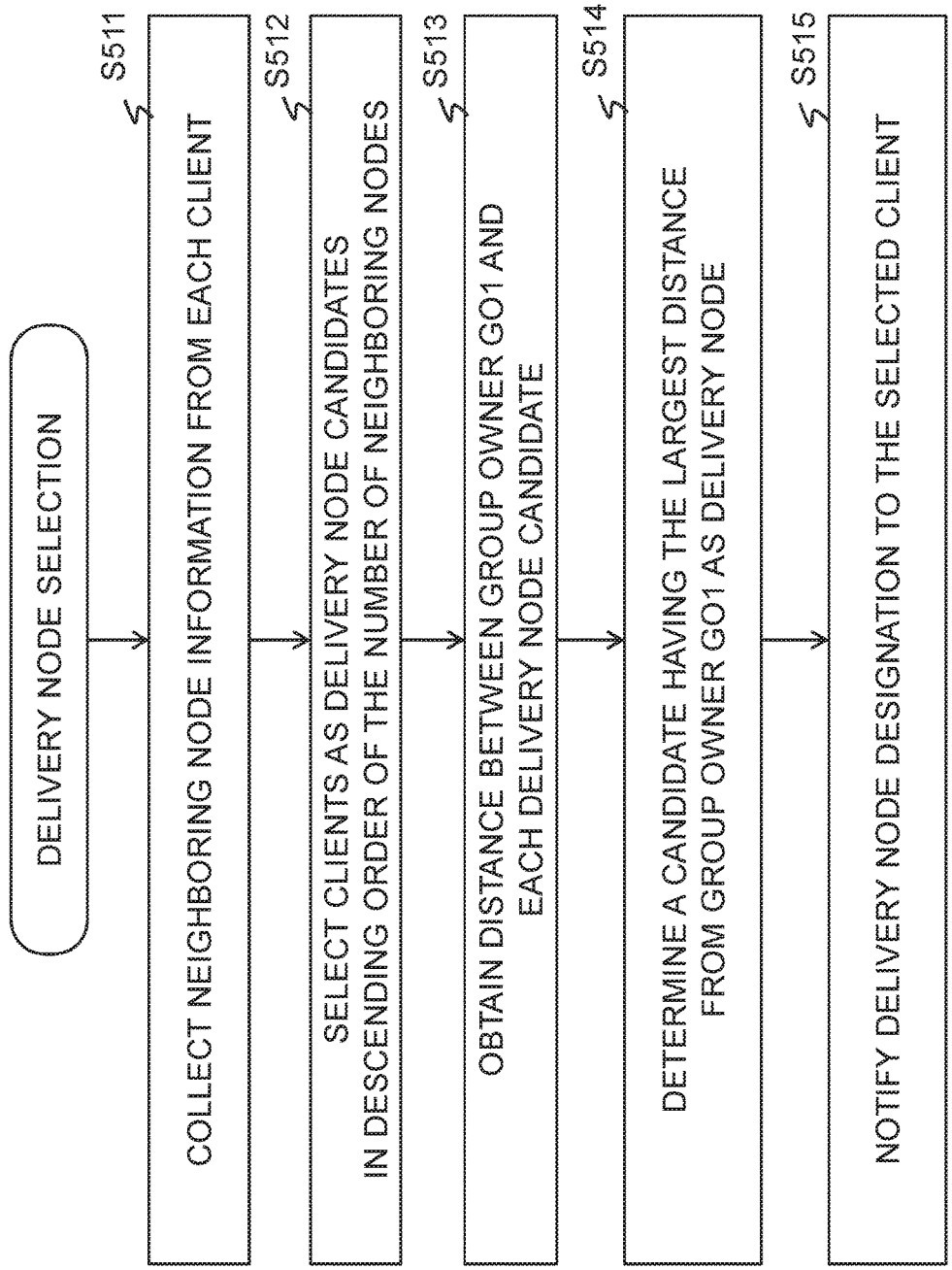

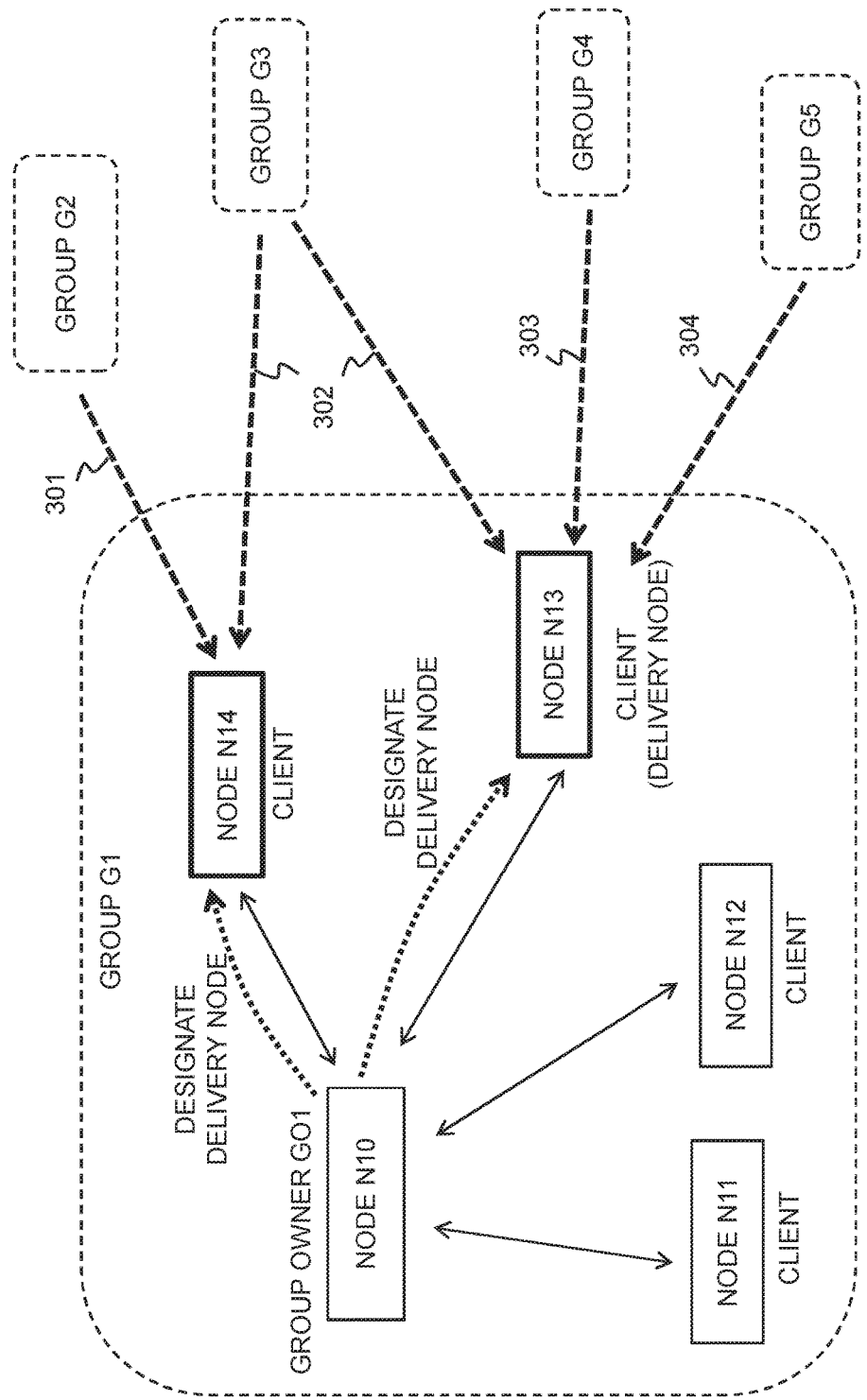

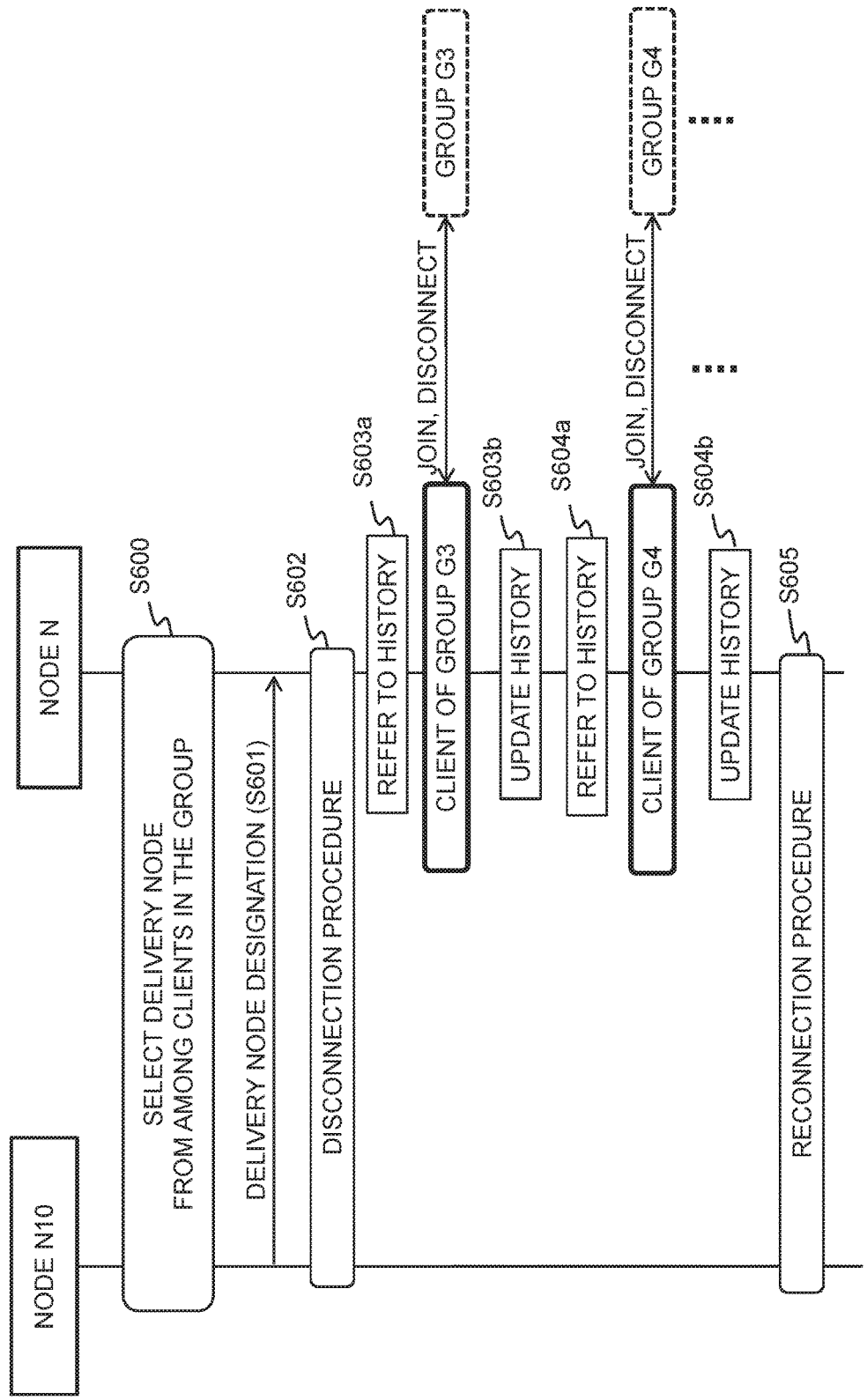

FOURTH EXEMPLARY EMBODIMENT

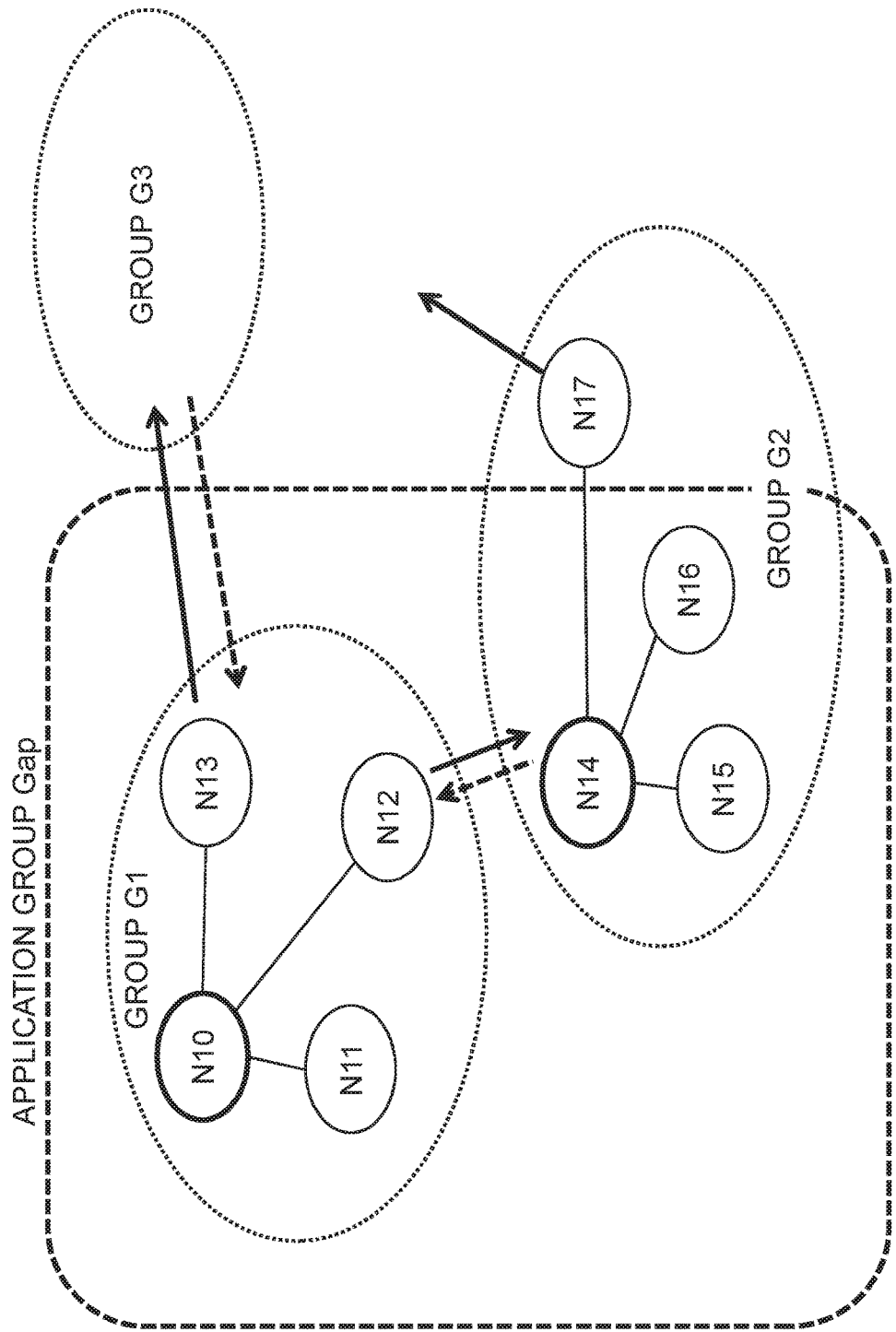

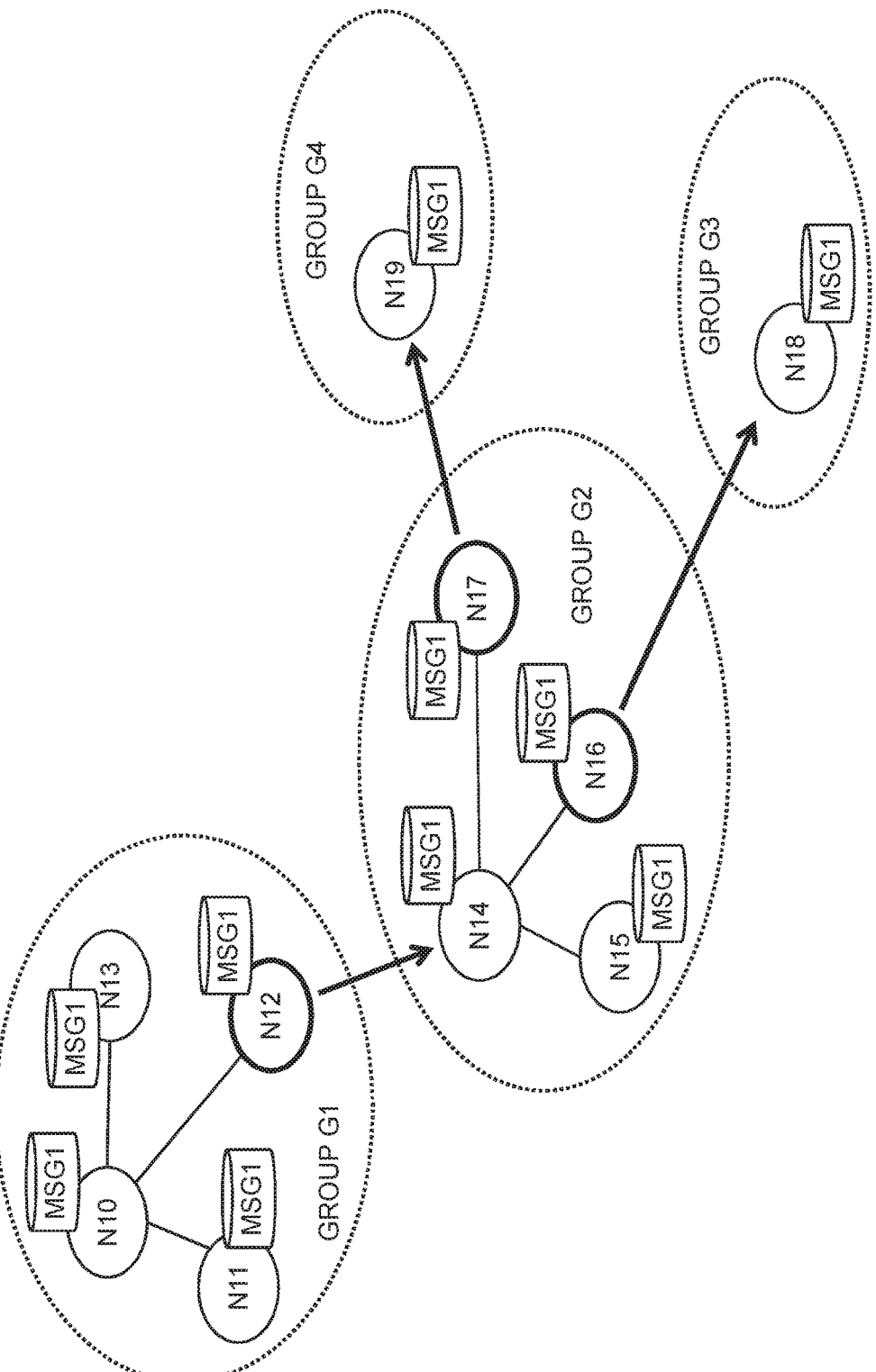

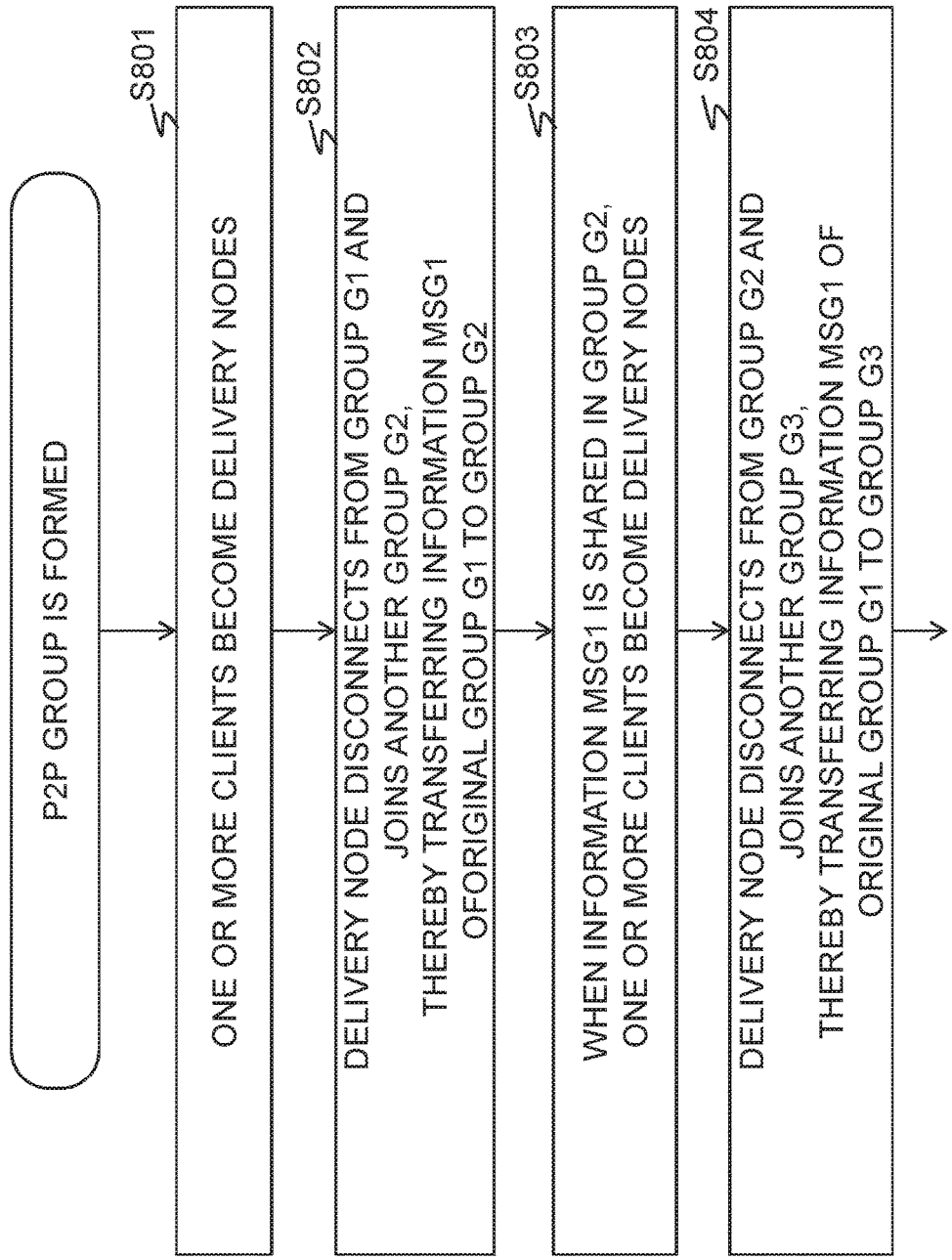

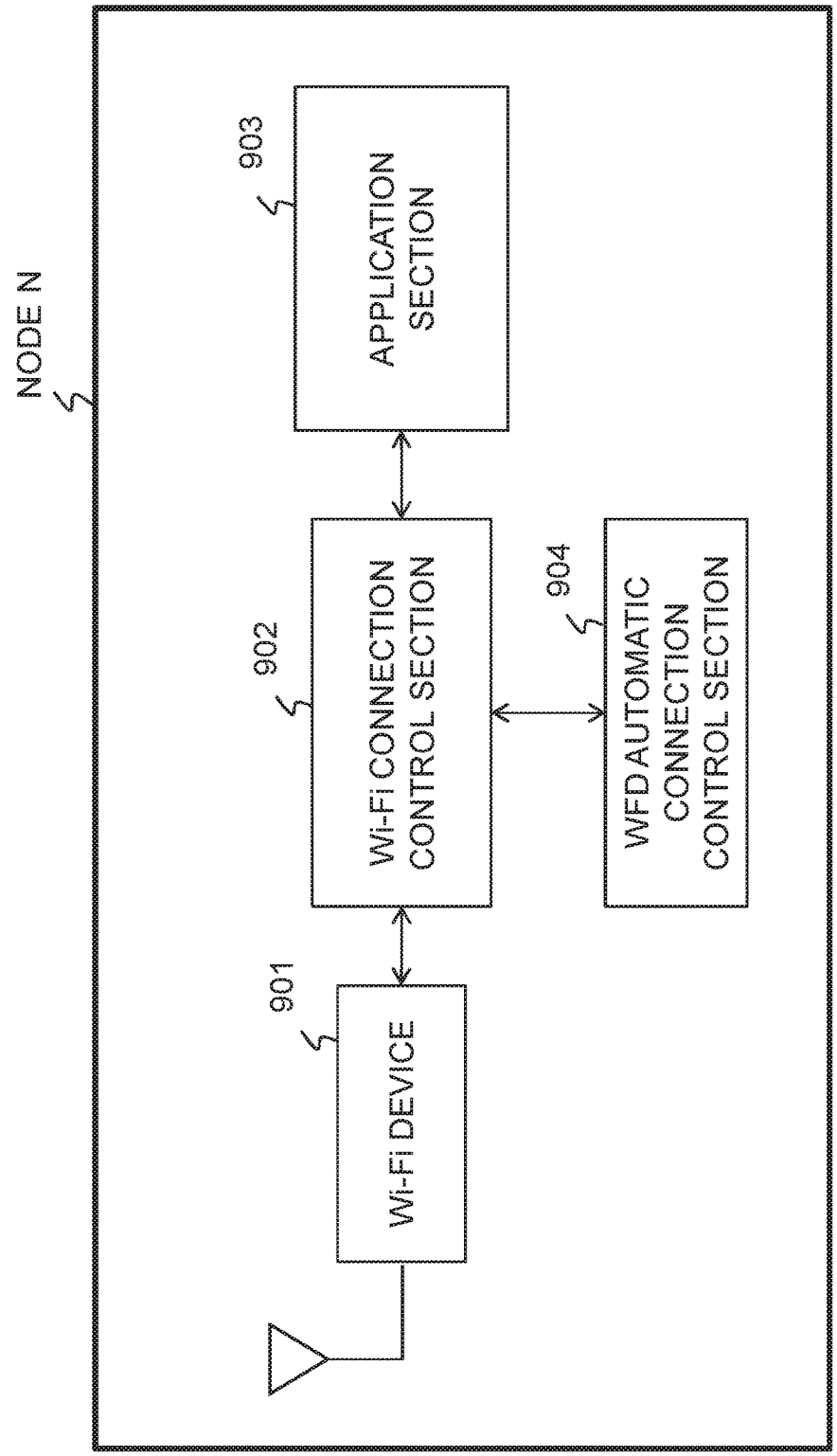

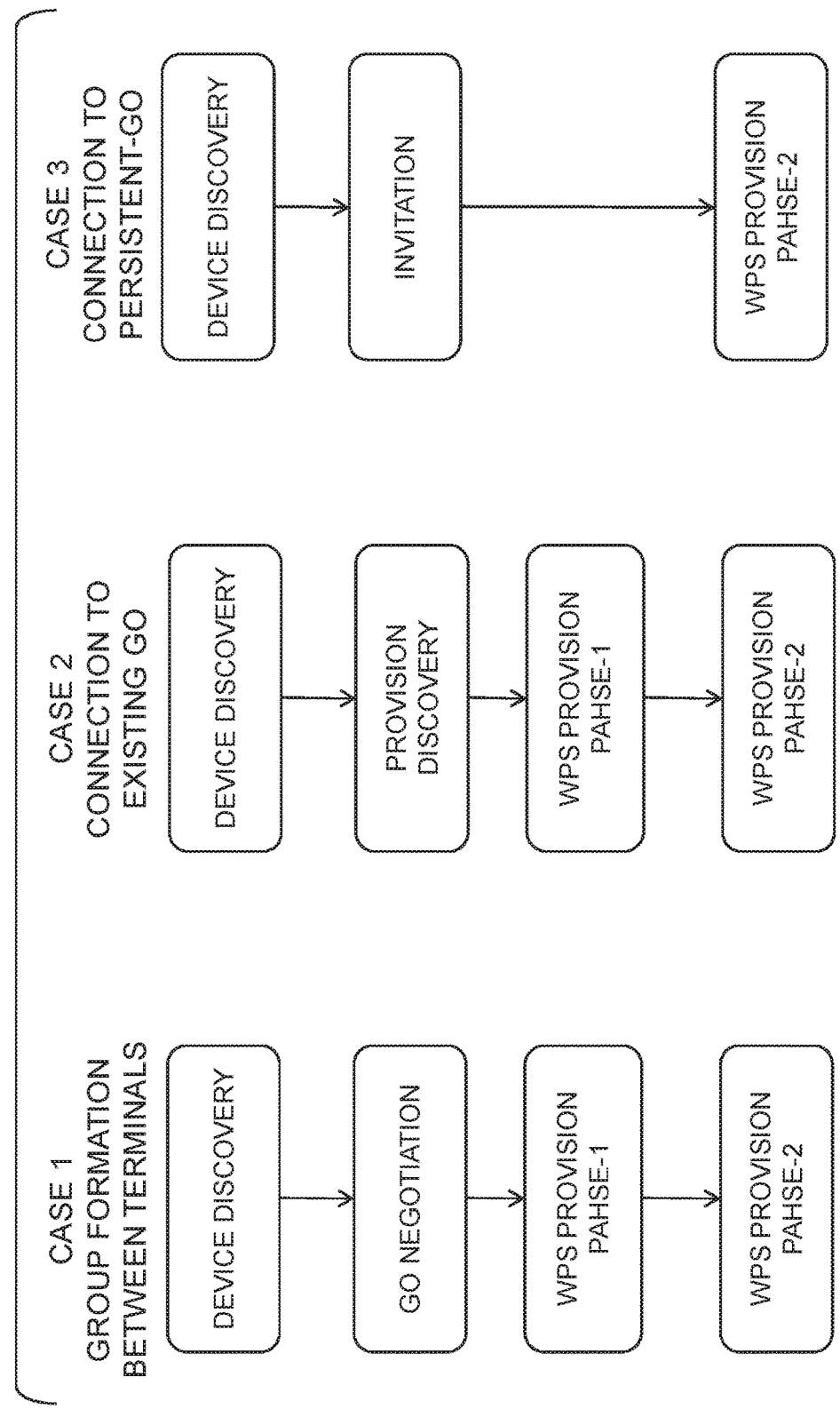

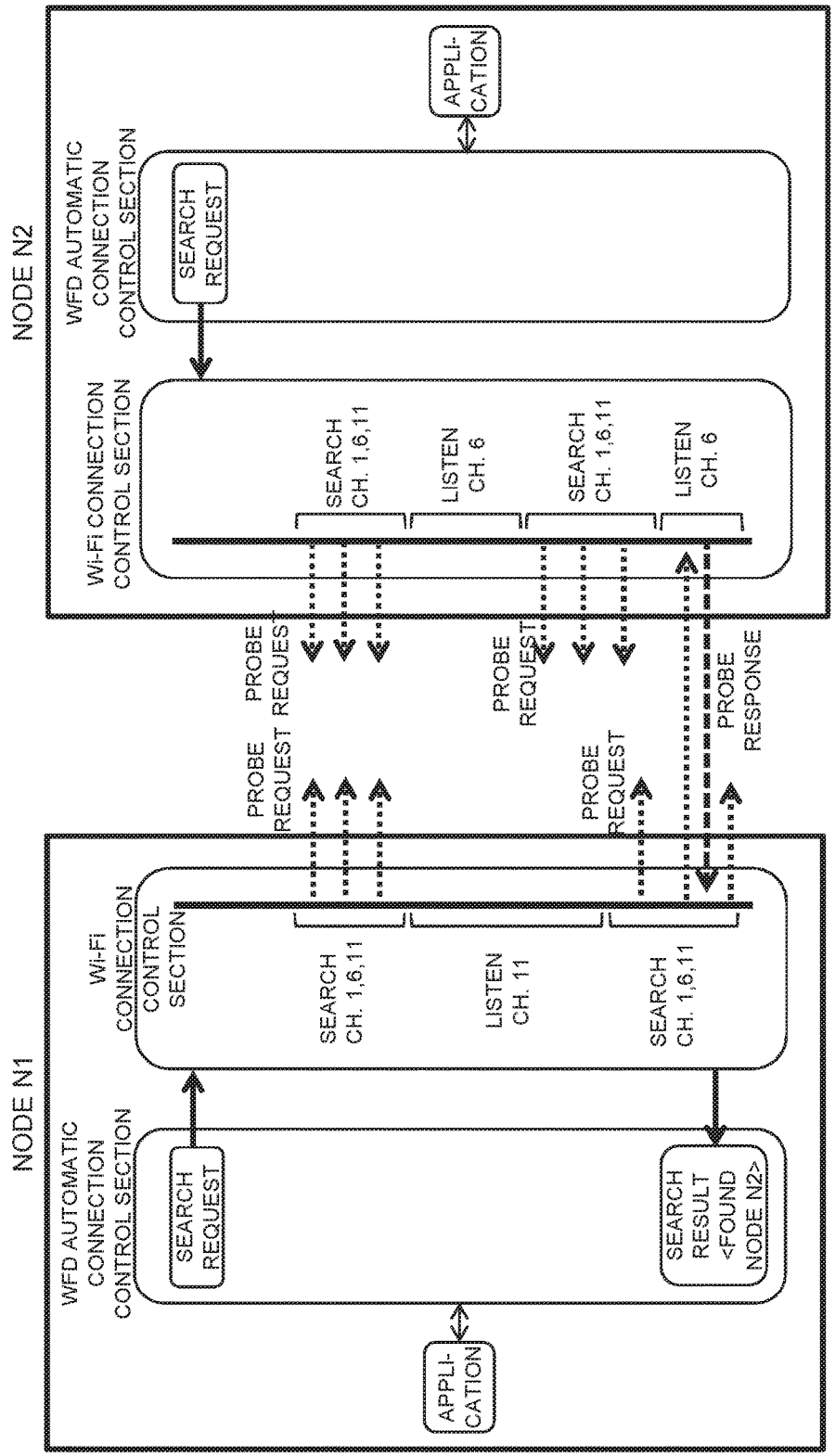

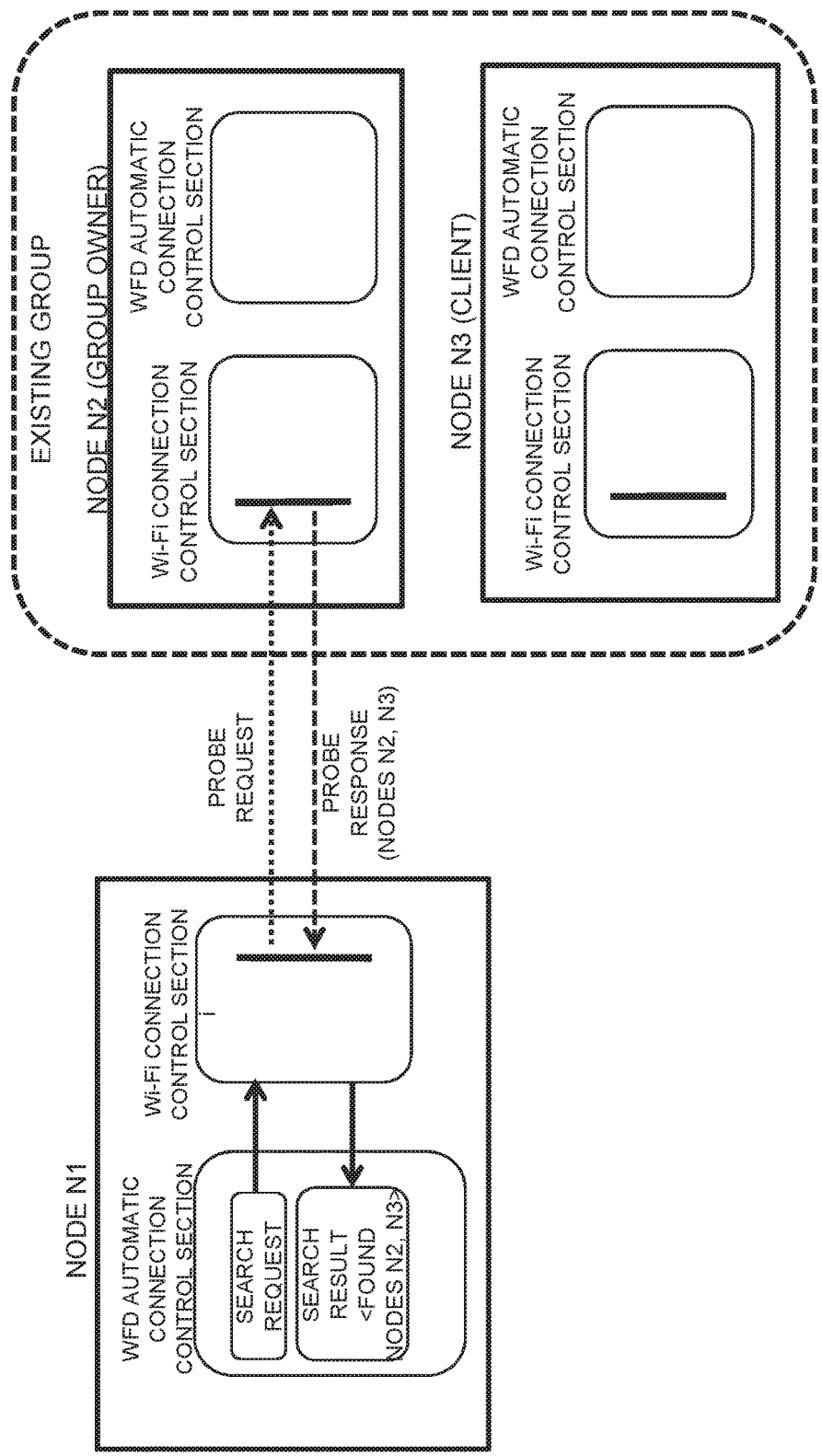

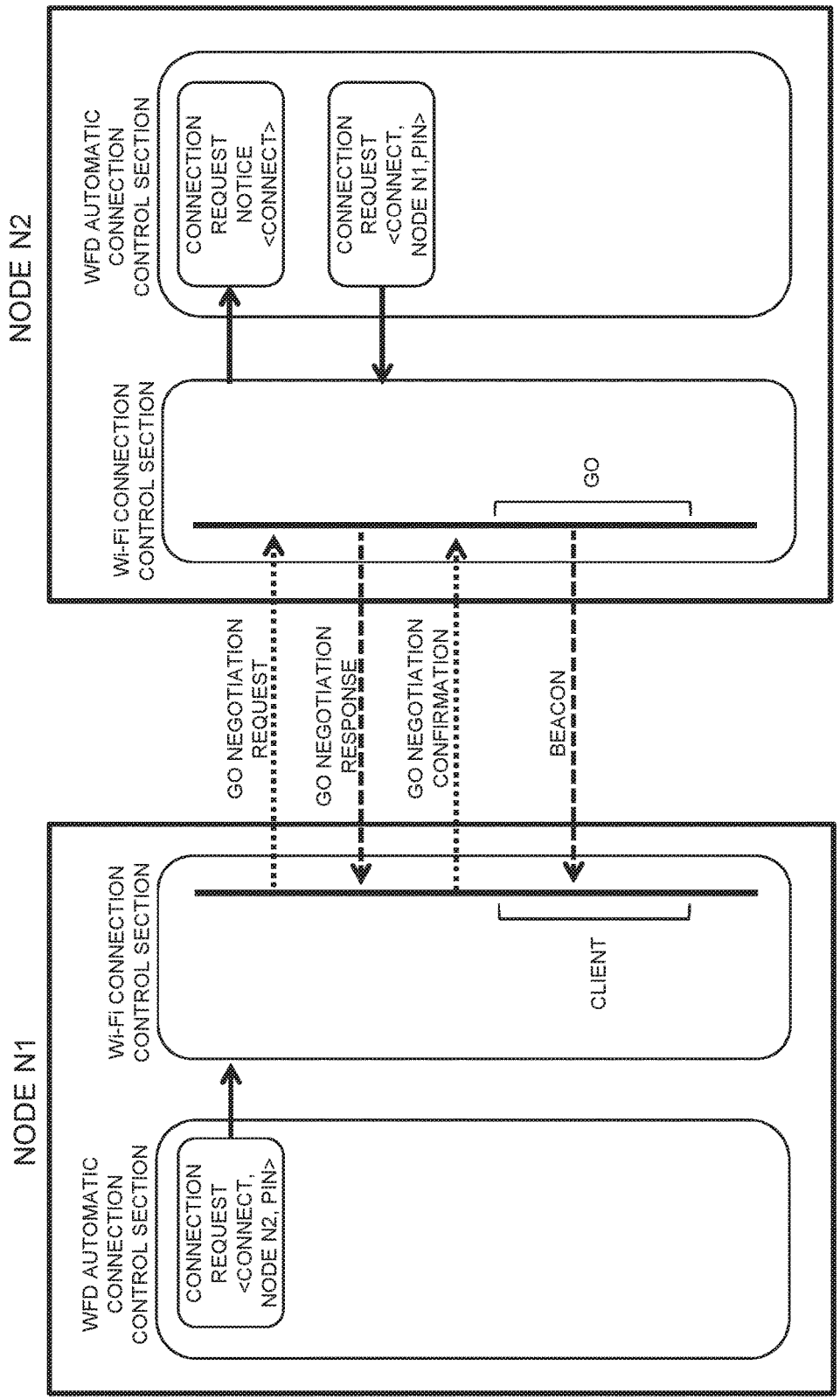

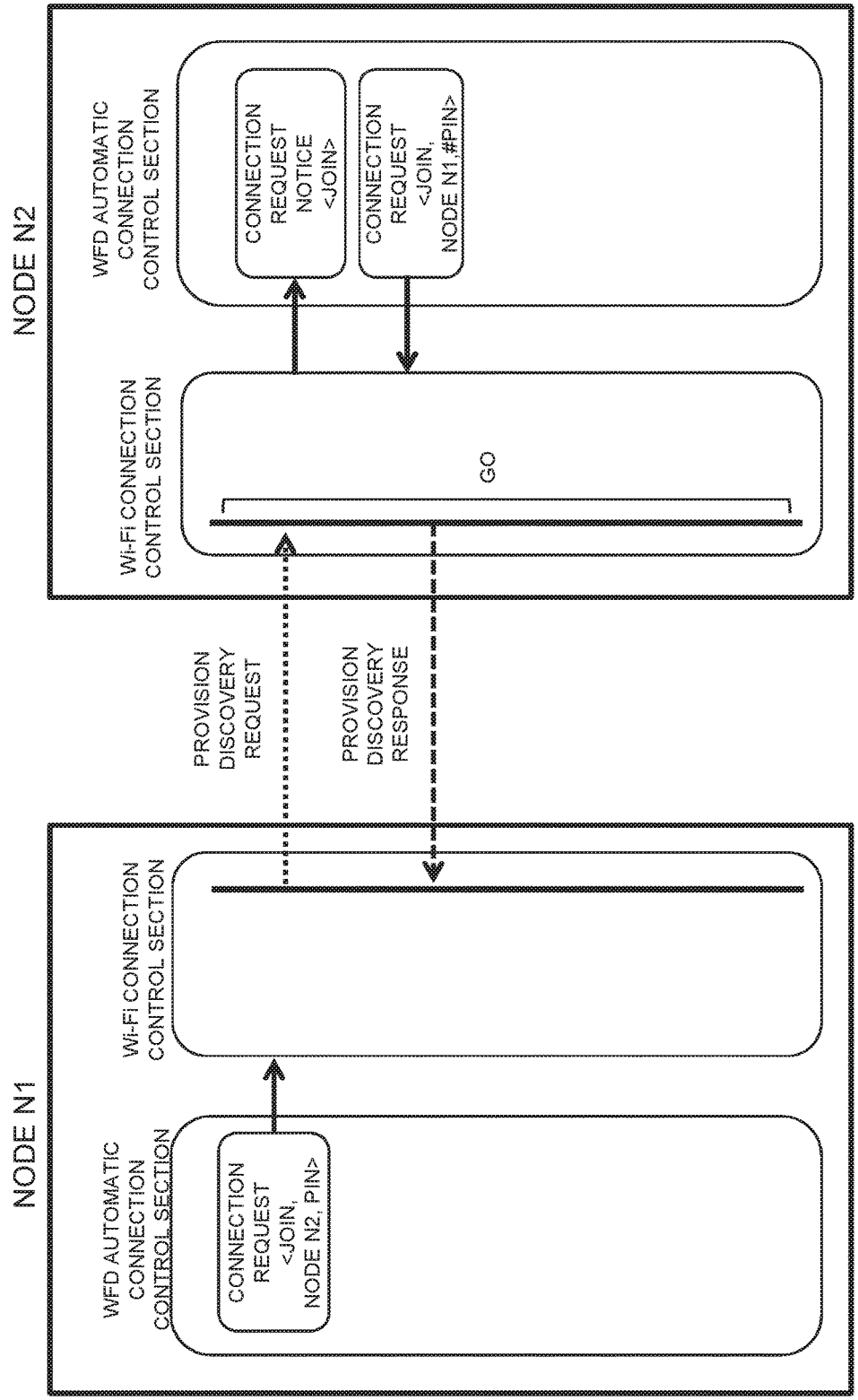

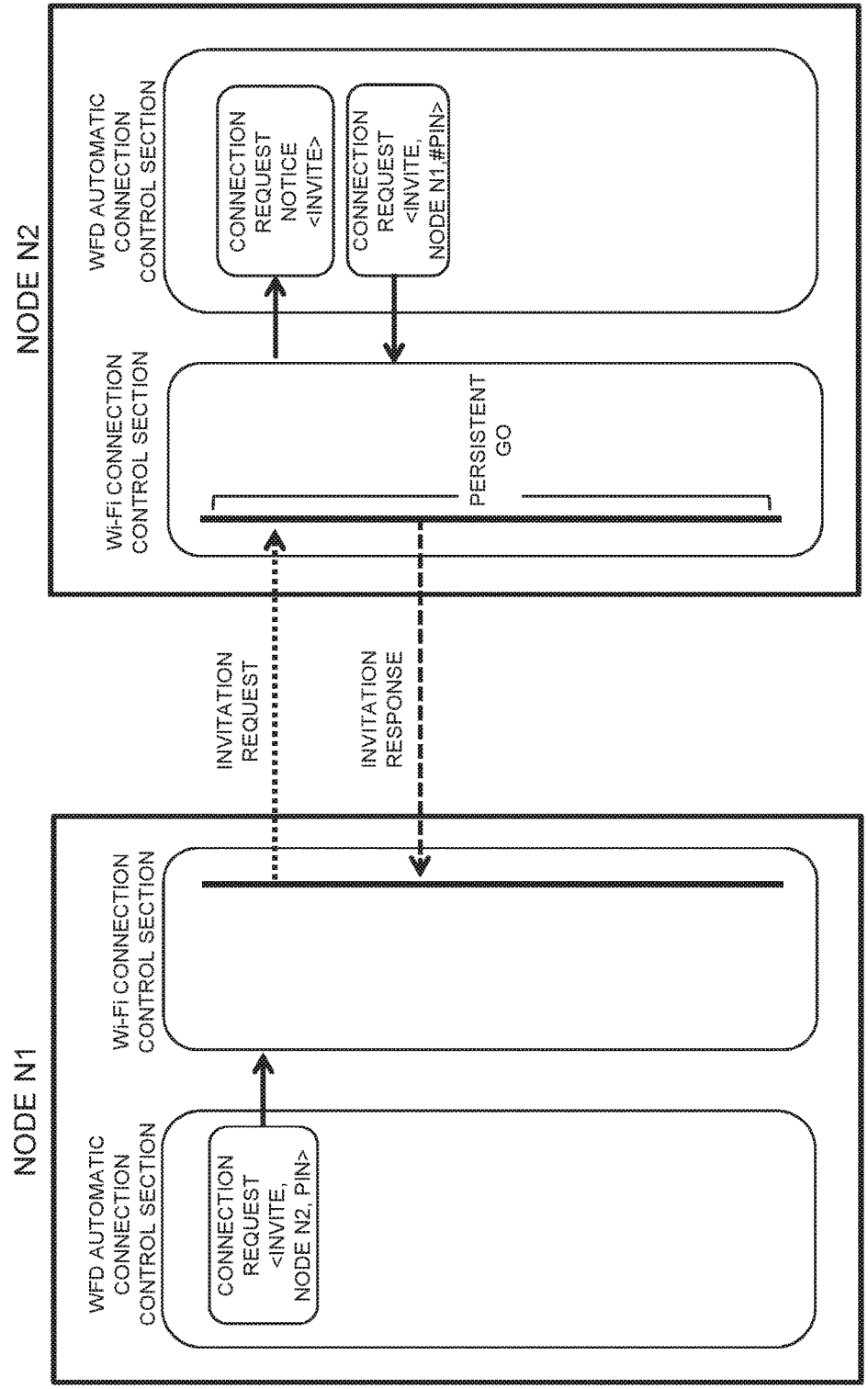

CLIENT-LED DISCONNECTION OPERATION

GROUP OWNER-LED DISCONNECTION OPERATION

METHOD AND SYSTEM FOR COMMUNICATION BETWEEN GROUPS IN WIRELESS COMMUNICATION NETWORK

CROSS-REFERENCE TO RELATED APPLICATIONS

This application is a national stage application of International Application No. PCT/JP2015/004006 entitled "Method and System for Communication Between Groups in Wireless Communication Network" filed on Aug. 10, 2015, which claims priority to Japanese Application No. 2014-164034 filed on Aug. 12, 2014, the disclosures of which are hereby incorporated by reference in their entirety.

TECHNICAL FIELD

The present invention relates to a wireless communication network including terminals that are capable of peer-to-peer (hereinafter, abbreviated as "P2P") wireless connection to each other (P2P terminals), and a communication technique in the same.

BACKGROUND ART

In recent years, Wi-Fi Direct has attracted attention as a terminal-to-terminal communication scheme in view of broader bandwidth, increased security, and the like. While conventional Wi-Fi networks work in the infrastructural mode with a specific device serving as an access point (AP), Wi-Fi Direct-compliant networks enable communication to be performed within a group, with any P2P terminal, not a specific device, serving as a group owner (NPL 1). A group owner is a P2P terminal that operates as an access point of a group and, as the parent of that group, can form the group including other P2P terminals as clients.

Within a P2P group formed as described above, terminals can share data and transfer data at high speed without connecting to the Internet or the like. Wi-Fi Direct, in particular, supports a robust security protocol and therefore can realize a higher level of security than the conventional ad-hoc mode (IBSS: Independent Basic Service Set and the like).

CITATION LIST

Non Patent Literature

[NPL 1]
Wi-Fi Alliance Technical Committee PSP Task Group, Wi-Fi Peer-to-Peer (P2P) Technical Specification Version 1.1

SUMMARY

Technical Problem

However, in the above-described wireless P2P network, since each group is formed and operates independently, data sharing is limited to within a group. Moreover, in general, there is a physical upper limit to the maximum number of terminals in one group. If the above-described Wi-Fi Direct is implemented by using inexpensive wireless LAN devices, the number of members of a group is limited to an upper limit of about five to ten that can be supported by each device. Such a limitation of group size limits message sharing to those terminals within a single group and hinders information sharing in a larger network that includes a plurality of groups. In the above-described wireless P2P network, for example, urgent disaster information, traffic information, SOS signals, or voice signals cannot be notified beyond a local group.

Accordingly, an object of the present invention is to provide a communication method and system that make it possible to transfer information between groups.

Solution to Problem

A communication method according to the present invention is a communication method in a wireless communication network including a plurality of nodes that can form a peer-to-peer group, and is characterized in that an owner node operating as an access point in one group selects one or a plurality of client nodes in this group as delivery nodes; the delivery node disconnects from the group and connects to another group that is present in vicinity; and information is transferred between the delivery node and an owner node of the another group.

A communication system according to the present invention is a communication system in a wireless communication network including a plurality of nodes that can form a peer-to-peer group, and is characterized in that an owner node operating as an access point in one group selects one or a plurality of client nodes within this group as delivery nodes, the delivery node disconnects from the group and connects to another group that is present in vicinity, and information is transferred between the delivery node and an owner node of the another group.

Advantageous Effects of Invention

According to the present invention, it is possible to share information between groups through a delivery node.

BRIEF DESCRIPTION OF DRAWINGS

FIG. 6A is a flowchart showing a first example of a method for selecting a delivery node.

FIG. 6B is a flowchart showing a second example of the method for selecting a delivery node.

FIG. 7 is a schematic network architecture diagram showing an example of a group-to-group communication system according to a third exemplary embodiment of the present invention.

FIG. 8 is a sequence chart showing operation in the group-to-group communication system shown in FIG. 7.

FIG. 11 is a schematic network architecture diagram showing an example of a group-to-group communication system according to a fifth exemplary embodiment of the present invention.

FIG. 12 is a schematic network architecture diagram showing a group-to-group communication system according to a sixth exemplary embodiment of the present invention.

FIG. 13 is a flowchart showing operation in the group-to-group communication system shown in FIG. 12.

FIG. 14 is a block diagram showing the functional configuration of a node according to an example of the present invention.

FIG. 15 is a flowchart showing cases of Wi-Fi Direct connection in the present example.

FIG. 16 is a schematic sequence chart showing operation of device discovery in the present example.

FIG. 17 is a schematic sequence chart showing operation of device discovery toward an existing group in the present example.

FIG. 18 is a schematic sequence chart showing operation of group owner negotiation between nodes in the present example.

FIG. 19 is a schematic sequence chart showing operation of connection to an existing group in the present example.

FIG. 20 is a schematic sequence chart showing operation of connection to a persistent GO in the present example.

DETAILED DESCRIPTION

Outline of Embodiments

Figure 1:
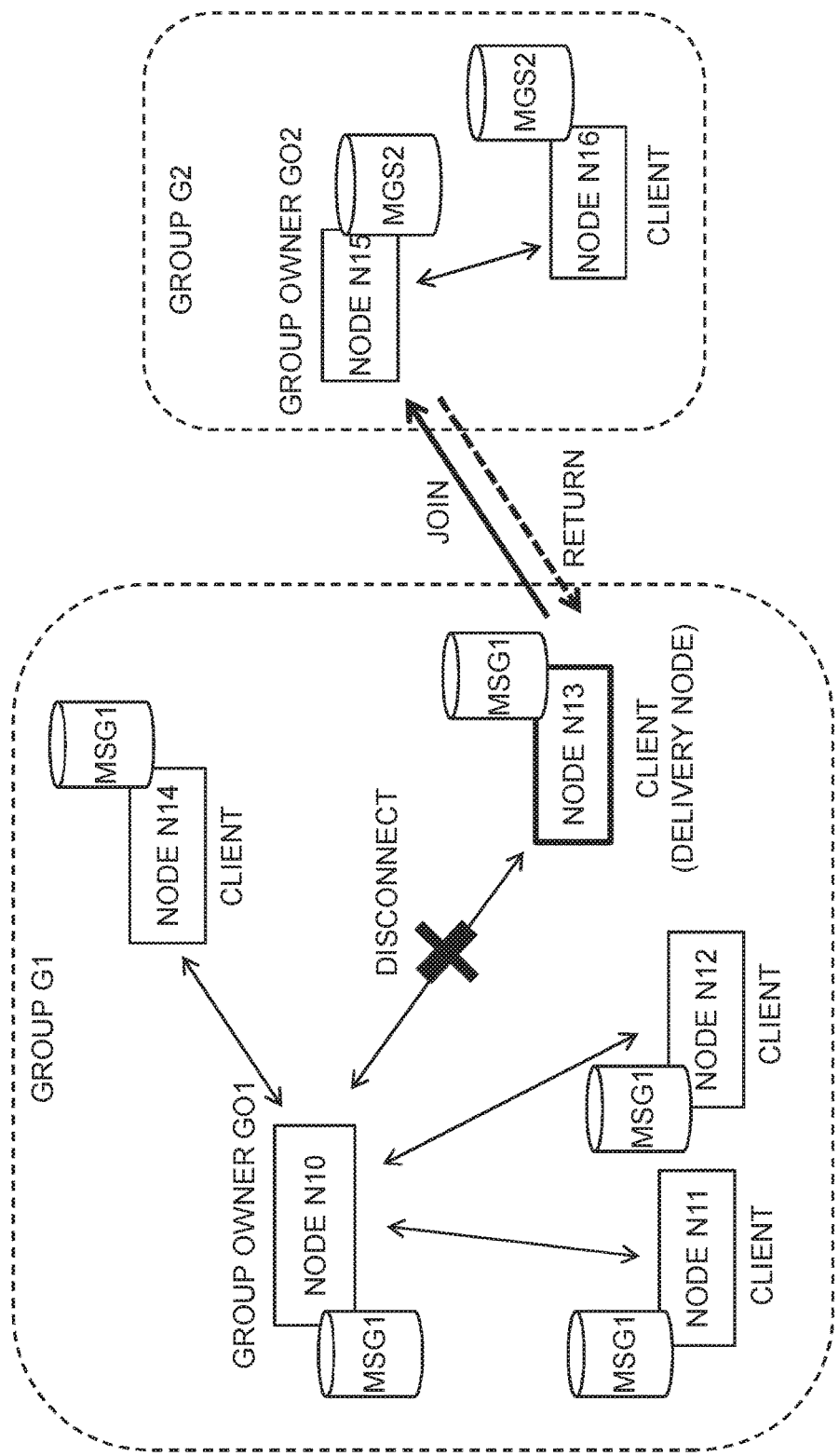
FIG. 1 is a network architecture diagram showing an example of a group-to-group communication system according to a first exemplary embodiment of the present invention.

According to exemplary embodiments of the present invention, one or a plurality of client nodes within a P2P group are designated as delivery nodes, and each of these delivery nodes leaves the group to which the delivery node itself belongs, and joins another group that is present in its vicinity. Thus a message shared in the original group is transferred to the other group via the delivery node, whereby information sharing between different groups is possible. For example, urgent disaster information, traffic information, SOS signals, voice signals, or the like can be broadly transferred beyond a local group.

It is preferable to select a delivery node from the viewpoint of efficiency in transferring information. For example, a delivery node can be selected based on the number of neighboring groups or nodes discovered by each client node, or based on the distance from the group owner, or based on the combination thereof. Information can be propagated more quickly and more widely in particular if a client node having a larger number of neighboring groups is selected as a delivery node. In addition, a delivery node may be selected at random, or may be selected depending on the temporal order of joining the group (new/old), the amount of communication, the timing of terminating communication, or the like.

If a delivery node joins a plurality of neighboring groups and transfers information thereto, there is a possibility that the same message is duplicately transferred to a group to which the message has been already transferred. To avoid such duplicate transfer, it is preferable that each delivery node keep a history of all groups the delivery node joined in the past.

Moreover, it is also possible to set a time interval from a delivery node's disconnection until its return to the original group. During that time, the delivery node that has disconnected sequentially joins neighboring groups and transfers a message while acquiring information of the neighboring groups, and then returns to the original group after timeout.

A limit to the number of members of a group can be eased by configuring a virtual application group at an upper layer of the group. If communication between groups as described above is possible, it is also possible to make rules for rearrangement of the constituent members (nodes) of the group under a constraint of a upper group that includes a plurality of groups. For example, rules can be made as follows: if a node is one registered with an upper application group, control is performed such that even if the node is designated as a delivery node, the node will return after a certain period of time, but such control is not imposed on the other nodes; or alternatively, to begin with such a node shall not be designated as a delivery node.

Next, each of the above-mentioned exemplary embodiments will be described in more detail with reference to drawings.

1. FIRST EXEMPLARY EMBODIMENT

According to a first exemplary embodiment of the present invention, a delivery node is selected among client nodes within a group, and this delivery node periodically leaves the group and joins another group that is present in vicinity, thereby delivering information to the other group.

1.1) System Architecture and Operation

Referring to FIG. 1, in a system according to the present exemplary embodiment, it is assumed that a plurality of nodes (here, seven nodes N10 to N16) form two groups G1 and G2. The group G1 is formed with the node N10 serving as the parent (group owner) and the nodes N11 to N14 as its clients. The group G2 is formed with the node N15 serving as the group owner and the node N16 as its client. Here, it is assumed that messages MSG1 and MSG2 are shared within the groups G1 and G2, respectively.

In the system having the above-described architecture, operation for delivering information from the group G1 to the group G2 will be described. Note that this is an example, and group-to-group communication from any group to its neighboring group can be performed similarly.

Figure 2:
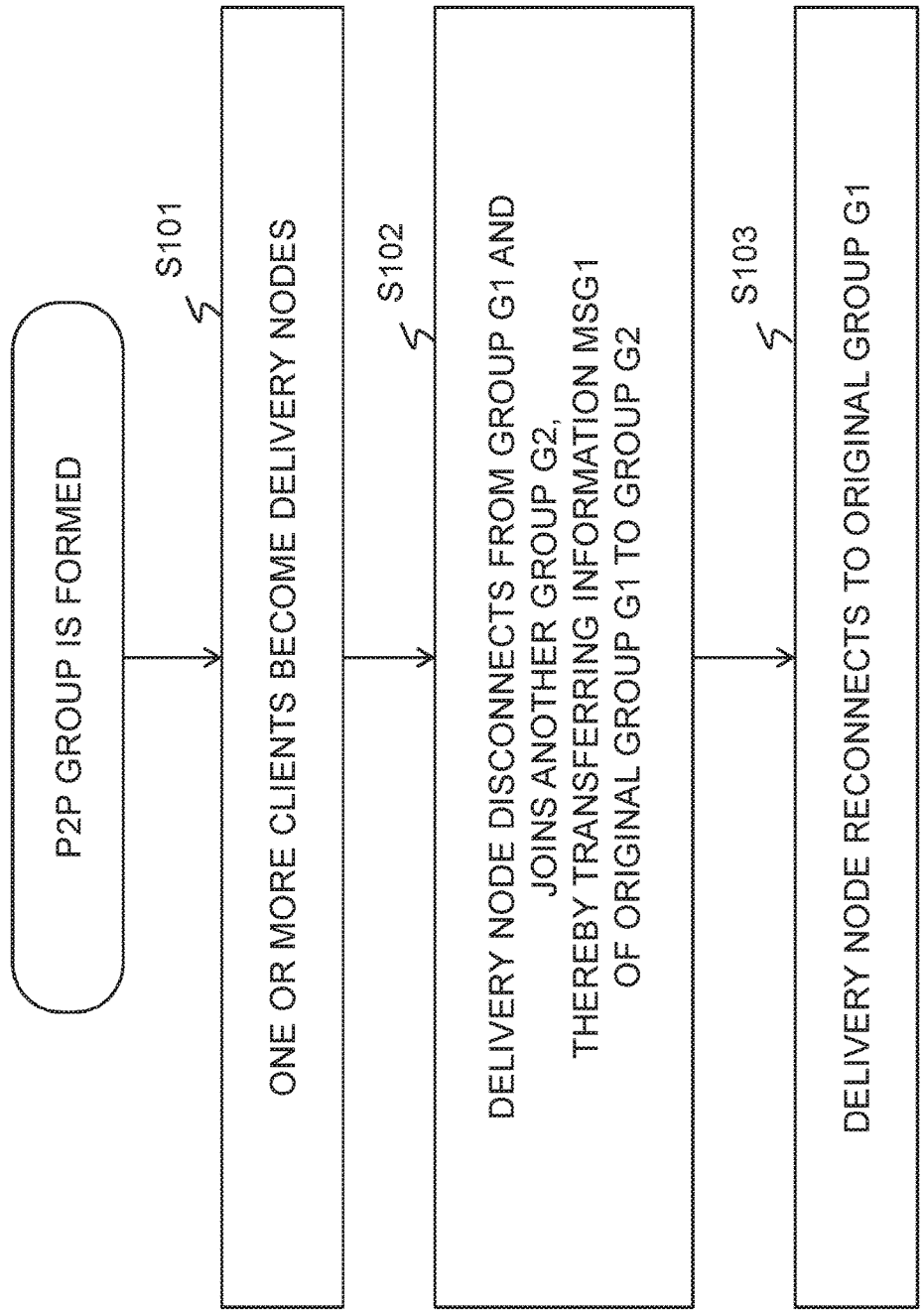
FIG. 2 is a flowchart showing operation in the group-to-group communication system shown in FIG. 1.

Referring to FIG. 2, in the group G1, one or more client nodes become delivery nodes (Operation S101). Hereinafter, it is assumed that the client node N13, which is a member of the group G1, becomes a delivery node.

The node N13 as a delivery node disconnects from the group owner (hereafter, abbreviated as GO) node N10 through a predetermined procedure and connects to the GO node N15 of the neighboring group G2 as a client. Thus the delivery node N13 can transfer the message MSG1 shared in the group G1 to the GO node N15 of the group G2 (Operation S102). Signals used in a procedure for joining the group G2 may be utilized for this transfer of the message MSG1. Note that the GO node N15 transfers the message MSG1 to the client node N16 in its own group G2.

In the case where the number of members of the neighboring group G2 reaches the upper limit, the delivery node N13 cannot join this group G2. This greatly reduces the advantage of a delivery node. Accordingly, it is preferable that the GO node of each group set the upper limit of the number of nodes it supports to a number obtained by subtracting one from the maximum number of nodes in a group in this system. Since a delivery node leaves as soon as it finishes delivering information, the chance of each group's accepting a delivery node is greatly increased. As another method, the GO node of each group may perform control such that a delivery node is preferentially accepted by temporarily disconnecting a relatively low-priority client node within the group, such as a node that is not performing communication or a node that has spent a relatively short time since the node joined the group.

Once delivery of the message MSG1 to the GO node N15 is finished, the delivery node N13 disconnects from the GO node N15 and reconnects to the original group G1 (Operation S103). However, not all of the delivery nodes necessarily have to return to the original group G1.

1.2) Node Configuration

The nodes N10 to N16 shown in FIG. 1 basically have the same functional configuration, and hereinafter the functional configuration of the nodes will be described with reference to FIG. 3. Here, it is assumed that the nodes include wireless terminals having a function of configuring a P2P group, for example, mobile stations and communication terminals such as mobile information terminals and mobile telephone terminals equipped with this function.

Figure 3:
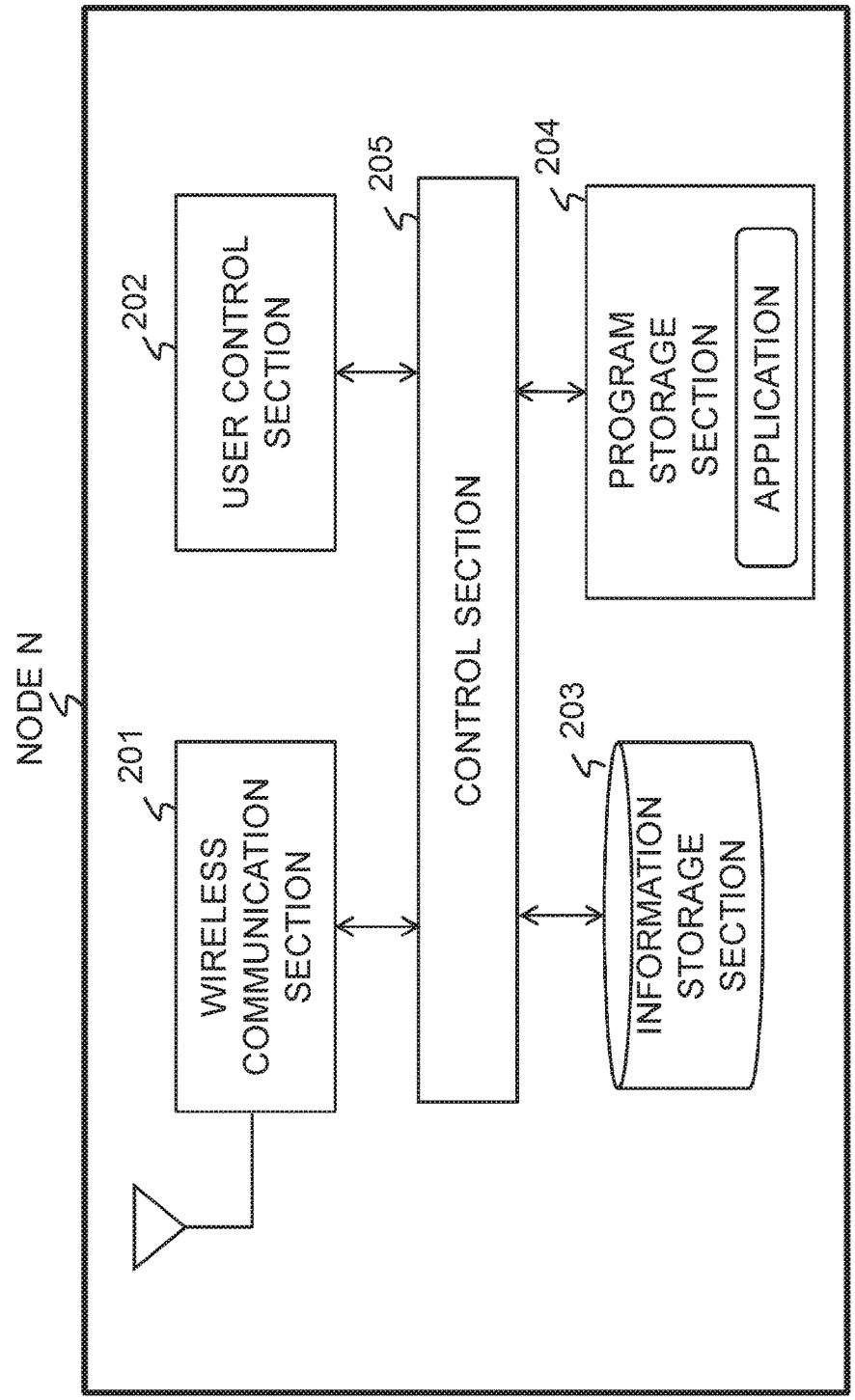
FIG. 3 is a block diagram showing the functional configuration of a node according to the first exemplary embodiment.

Referring to FIG. 3, the node N includes a wireless communication section 201, a user control section 202, an information storage section 203, a program storage section 204, and a control section 205 for the node. The wireless communication section 201 is capable of P2P communication, which will be described later, and may be additionally capable of communicating with a radio base station of a mobile communication system or with a wireless LAN base station. Moreover, the wireless communication section 201 can detect the presence of another P2P group and the presence of another wireless LAN by scanning beacons broadcast from nodes that are present in vicinity.

The user control section 202 has a P2P automatic connection function that manages predetermined procedures for P2P group formation, joining, disconnection, and the like, and controls the wireless communication section 201 on behalf of a communication application. Note that similar control can be also performed by using a communication application. The information storage section 203 stores information such as a message shared within a group to which the own node is connected, a message acquired from a delivery node that joins from another group, a group history in case of functioning as a delivery node, or the like, which will be described later.

The program storage section 204 stores communication applications and the like in addition to programs for functioning as a node, and the control section 205 executes these programs and applications, thereby controlling P2P node operation. Further, it is also possible that the operation of the user control section 202 for group formation and the like is restricted by executing a predetermined application, which will be described later.

Furthermore, the node N may be provided with a location detector for detecting the geographical location of the own station, a communication amount monitor for monitoring the amount of communication, and the like. The location detector only needs to be capable of identifying the location of the own station to some degree. For example, the location may be detected by utilizing signals from fixed base stations, or a GPS (Global Positioning System) receiver may be used.

1.3) Effects

As described above, according to the first exemplary embodiment of the present invention, a delivery node is designated as appropriate within a group, whereby group-to-group communication is possible, and widespread deployment of a P2P network can be achieved beyond a limit of the number of members of a group. Since a message shared within an original group can be spread over to another group in particular, it is possible to share information between different groups. For example, it can be easily achieved to share urgent traffic information among many moving vehicles, and to share a disaster-related message among many smartphones and the like.

2. SECOND EXEMPLARY EMBODIMENT

According to a second exemplary embodiment of the present invention, a delivery node is selected based on the number of neighboring groups or the number of nodes discovered by each client node within a group. The selected delivery node leaves the original group periodically, or when a predetermined condition is met, and joins another group that is present in vicinity, whereby information shared in the original group can be transferred to the other group.

2.1) System Architecture

Figure 4:
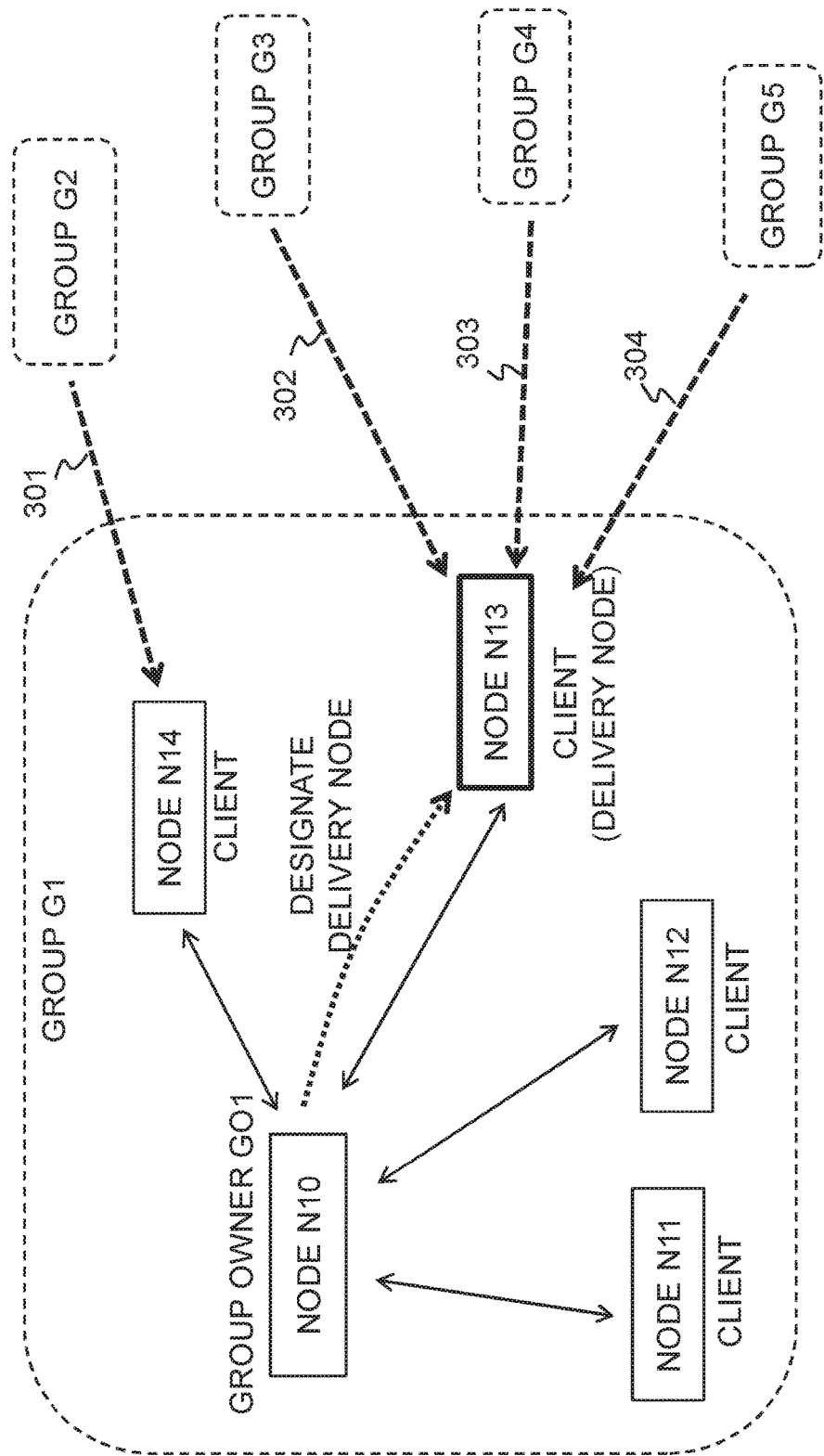
FIG. 4 is a schematic network architecture diagram showing an example of a group-to-group communication system according to a second exemplary embodiment of the present invention.

Referring to FIG. 4, in a system according to the present exemplary embodiment, it is assumed that a plurality nodes (here, five nodes N10 to N14) form a group G1, with the node 10 serving as the parent (group owner) and the nodes N11 to N14 as its clients. Moreover, it is assumed that a message MSG1 is stored in the information storage section 303 of each member node of the group G1.

Hereinafter, for simplified description, a case will be described as an example where a plurality of groups G2 to G5 are present in the vicinity of the group G1, the client nodes N13 and N14 each send a probe request for Device Discovery processing, and the client node N13 detects probe responses 302, 303 and 304 from the Groups G3, G4 and G5, respectively, and the client node N14 detects a probe response 301 from the group G2.

2.2) Operation

Figure 5:
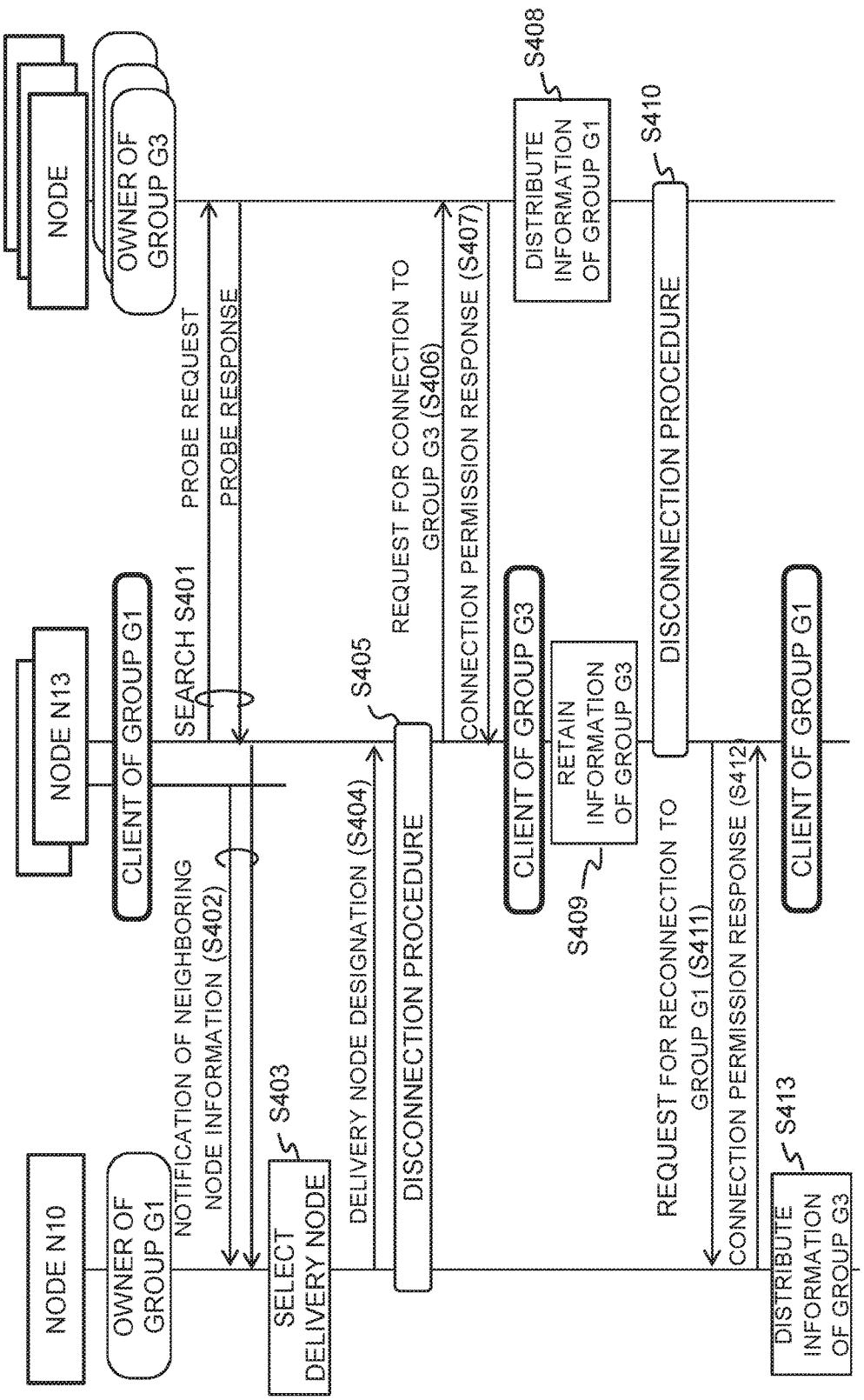
FIG. 5 is a sequence chart showing operation in the group-to-group communication system shown in FIG. 4.

Referring to FIG. 5, each of the client nodes N11 to N14 belonging to the group G1, when receiving a probe response to a probe request it has sent from a group node that is present in vicinity (Operation S401), notifies information on the group owner discovered with this probe response, as neighboring node information, to the GO node N10 (Operation S402).

The control section 205 of the GO node N10 selects a delivery node based on the number of neighboring nodes, which is obtained from the neighboring node information notified from each client node (Operation S403). Assuming that a client node that has discovered the largest number of neighboring nodes is selected as a delivery node, the client node N13 is selected as a delivery node, and the GO node N10 notifies a disconnection instruction to the node N13 (Operation S404). For disconnection of the node N13, the GO node N10 may disconnect the node N13, or the node N13 may disconnect itself. Note that the selected delivery node is not always one. It is also possible that the control section 205 of the GO node N10 sorts the numbers of neighboring nodes of the plurality of client nodes in descending order and selects two or more client nodes that have the most neighboring nodes as delivery nodes. In this case as well, the operation of each of the selected delivery nodes is as described below.

When being designated as a delivery node, the control section 205 of the node N13 instructs the user control section 202 to perform a procedure for disconnecting from the GO node N10 (Operation S405). The node N13 that has thus left the group G1 initiates a procedure for joining a discovered neighboring group. Illustrating a case of joining the group G3, the node N13 sends a connection request to the GO node of the group G3 (Operation S406). When receiving a permission response thereto (Operation S407), the node N13, as a client of the group G3, transfers the information shared in the group G1 to the GO node of the group G3, and the GO node of the group G3 distributes that shared information to client nodes under its coverage (Operation S408). Information transfer from the delivery node N13 to the group G3 may be performed as data transmission from a client to the group owner, or the information can be also sent by using the connection request message in Operation S406. Moreover, the delivery node N13 can also receive information shared in the group G3 from the GO node of the group G3 and stores it in the information storage section 203 (Operation S409).

Note that the GO node of each group can set the upper limit of the number of nodes it supports to a number obtained by subtracting one from the maximum number of nodes in a group in this system in order to increase the chance of a delivery node's joining. Alternatively, it is also possible that the GO node of each group preferentially accepts a delivery node by temporarily disconnecting a relatively low-priority client node within the group.

When information transfer is thus finished, the control section 205 of the delivery node N13 instructs the user control section 202 to perform a procedure for disconnecting from the GO node of the group G3 (Operation S410). Alternatively, it is also possible that the group G3 initiates the disconnection procedure when information transfer is finished. The delivery node N13 that has thus left the group G3 sends a connection request to the GO node N10 of the original group G1 (Operation S411) and, when receiving a permission response thereto (Operation S412), returns to a client of the group G1 and transfers the information shared in the group G3 to the GO node N10 of the group G1, whereby the GO node N10 of the group G1 can distribute this shared information to the client nodes under its coverage (Operation S413).

2.3) Delivery Node Selection Criterion

Referring to FIG. 6A, a GO node can select a client node to become a delivery node based on the number of neighboring groups/nodes discovered by each client node. That is, the GO node N10 collects neighboring group/node information from each of all client nodes N11 to N14 (Operation S501) and selects a client node that has the largest number of neighboring groups/nodes as a delivery node (Operation S502). Subsequently, the GO node N10 notifies a disconnection instruction to the client node selected as a delivery node (Operation S503).

2.4) Modification Example of Delivery Node Selection Criterion

Referring to FIG. 6B, it is also possible that a GO node selects a client node to become a delivery node based on the distance of each client node from the GO node in addition to the above-described number of neighboring groups/nodes. For example, when the GO node N10, as described above, collects neighboring group/node information from each of all client nodes N11 to N14 (Operation S511) and selects among them one or more client nodes as delivery node candidates in the descending order of the number of neighboring groups/nodes (Operation S512), then the GO node N10 calculates the distance of each delivery node candidate from the GO node N10 by using location information obtained by a location detector (Operation S513) and determines the most distant candidate as a delivery node (Operation S514). Thereafter, the GO node N10 notifies a disconnection instruction to the client node selected as a delivery node (Operation S515).

2.5) Other Modification Examples of Delivery Node Selection Criterion

Not only the above-described delivery node selection based on the number of neighboring nodes, but it is also possible that a delivery node is selected based on the distance from the GO node N10. That is, the GO node N10 may calculate the distance of each client node from the GO node N10 by using location information obtained by a location detector and may select the most distant client node as a delivery node.

Moreover, a delivery node can be also selected based on the above-described number of neighboring groups/nodes, distance from GO, a time stamp indicating a time point when a client node joins, or a combination of any of these items. Further, a delivery node may be selected at random among the client nodes, or may be selected at random among the delivery node candidates that have been selected based on the above-described various selection criteria.

2.6) Delivery Node Disconnection Timing

The GO node N10 can be triggered to disconnect a delivery node, for example, by a condition as listed below.
 When a client node to become a delivery node discovers a new neighboring group
 When timeout of a timer for measuring a certain period of time occurs (periodical disconnection)
 When a client node that has joined as a delivery node finishes delivering a content 2.7) Effects As described above, according to the second exemplary embodiment of the present invention, in addition to the above-described effects of the first exemplary embodiment, quick information sharing between different groups is possible because a delivery node is selected from the viewpoint of efficiency in transferring information. A delivery node is selected based on the number of neighboring nodes discovered by each client node within a group as described above, whereby information can be propagated quickly and widely.

3. THIRD EXEMPLARY EMBODIMENT

According to a third exemplary embodiment of the present invention, when a delivery node joins a plurality of neighboring groups and transfers information, the delivery node keeps a history of all groups it joined to deliver information in the past, whereby the possibility of duplicate delivery to a group where delivery has been already made can be reduced.

3.1) System Architecture

Referring to FIG. 7, in a system according to the present exemplary embodiment, it is assumed that a plurality of nodes (here, five nodes N10 to N14) form a group G1, with the node N10 serving as the parent (group owner) and the nodes N11 to N14 as its clients. Moreover, it is assumed that a message MSG1 is stored in the information storage section 303 of each member node of the group G1.

Hereinafter, for simplified description, a case will be described as an example where a plurality of groups G2 to G5 are present in the vicinity of the group G1, the client node N13 detects beacons 302, 303 and 304 from the Groups G3, G4 and G5, respectively, and the client node N14 detects beacons 301 and 302 from the groups G2 and G3, respectively.

3.2) Operation

Referring to FIG. 8, the GO node N10 of the group G1 selects at least one delivery node among the client nodes N11 to N14 as described in the second exemplary embodiment above (Operation S600) and gives a delivery node designation to each selected delivery node (Operation S601). Here, it is assumed that the nodes N13 and 14 are selected as delivery nodes, as shown in FIG. 7. The nodes N13 and N14 designated as delivery nodes each perform a procedure for disconnecting from the GO node N10 (Operation S602), join their respective neighboring groups while referring to their respective delivery histories, and update the respective delivery histories after performing information transfer.

For example, the delivery node N13 first refers to the delivery history stored in the information storage section 203 and determines whether or not delivery has been already made to the GO node of the group G3 (Operation S603a). If delivery has not yet been made, the delivery node N13 becomes a client of the group G3 and performs information delivery, and thereafter leaves the group G3 and updates the delivery history (Operation S603b).

Subsequently, the delivery node N13 refers to the delivery history stored in the information storage section 203 and determines whether or not delivery has been already made to the GO node of the group G4 (Operation S604a). If delivery has not yet been made, the delivery node N13 becomes a client of the group G4 and performs information delivery, and thereafter leaves the group G4 and updates the delivery history (Operation S604b). Thereafter, the delivery node N13 repeats information delivery and history update in a similar manner while referring to the delivery history for each neighboring group discovered, and updates the delivery history each time. When information delivery to the neighboring groups is thus finished, the delivery node N13 returns to the original group G1 (Operation S605).

3.3) Effects

As described above, according to the third exemplary embodiment of the present invention, in addition to the above-described effects of the first and second exemplary embodiments, when a single delivery node delivers information to a plurality of neighboring groups, the delivery node refers to the delivery history, whereby the possibility of duplicate delivery to a group where delivery has been already made can be reduced.

4. FOURTH EXEMPLARY EMBODIMENT

According to a fourth exemplary embodiment of the present invention, a time period from a delivery node's leaving the original group until its return thereto, or the number of neighboring groups to which a delivery node should connect, is set, whereby it is possible to secure time for which the delivery node performs information delivery, or ensure information delivery, and to ensure the return of the delivery node.

4.1) System Architecture

Figure 9:
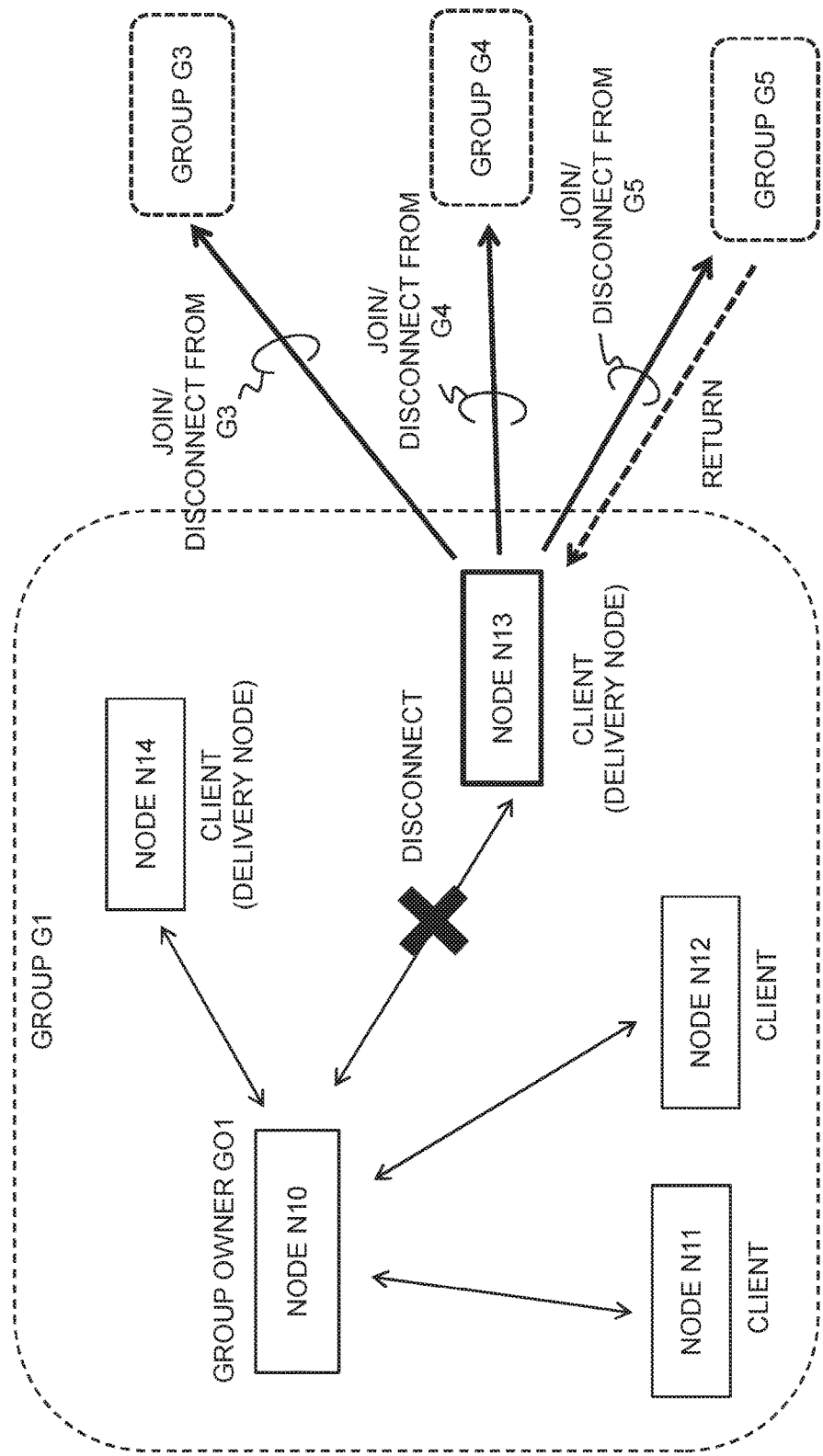
FIG. 9 is a schematic network architecture diagram showing an example of a group-to-group communication system according to a fourth exemplary embodiment of the present invention.

Referring to FIG. 9, in a system according to the present exemplary embodiment, it is assumed that a plurality of nodes (here, five nodes N10 to N14) form a group G1, with the node N10 serving as the parent (group owner) and the nodes N11 to N14 as its clients. Each node is provided with a timer function, with which a timer for defining a delivery period for a delivery node is set. Moreover, it is assumed that a message MSG1 is stored in the information storage section 203 of each member node of the group G1.

Hereinafter, for simplified description, a case will be described as an example where a plurality of groups G3 to G5 are present in the vicinity of the group G1, and the client node N13 detects beacons from the groups G3, G4 and G5, respectively, and, as a delivery node, delivers information to each group.

4.2) Operation

Figure 10:
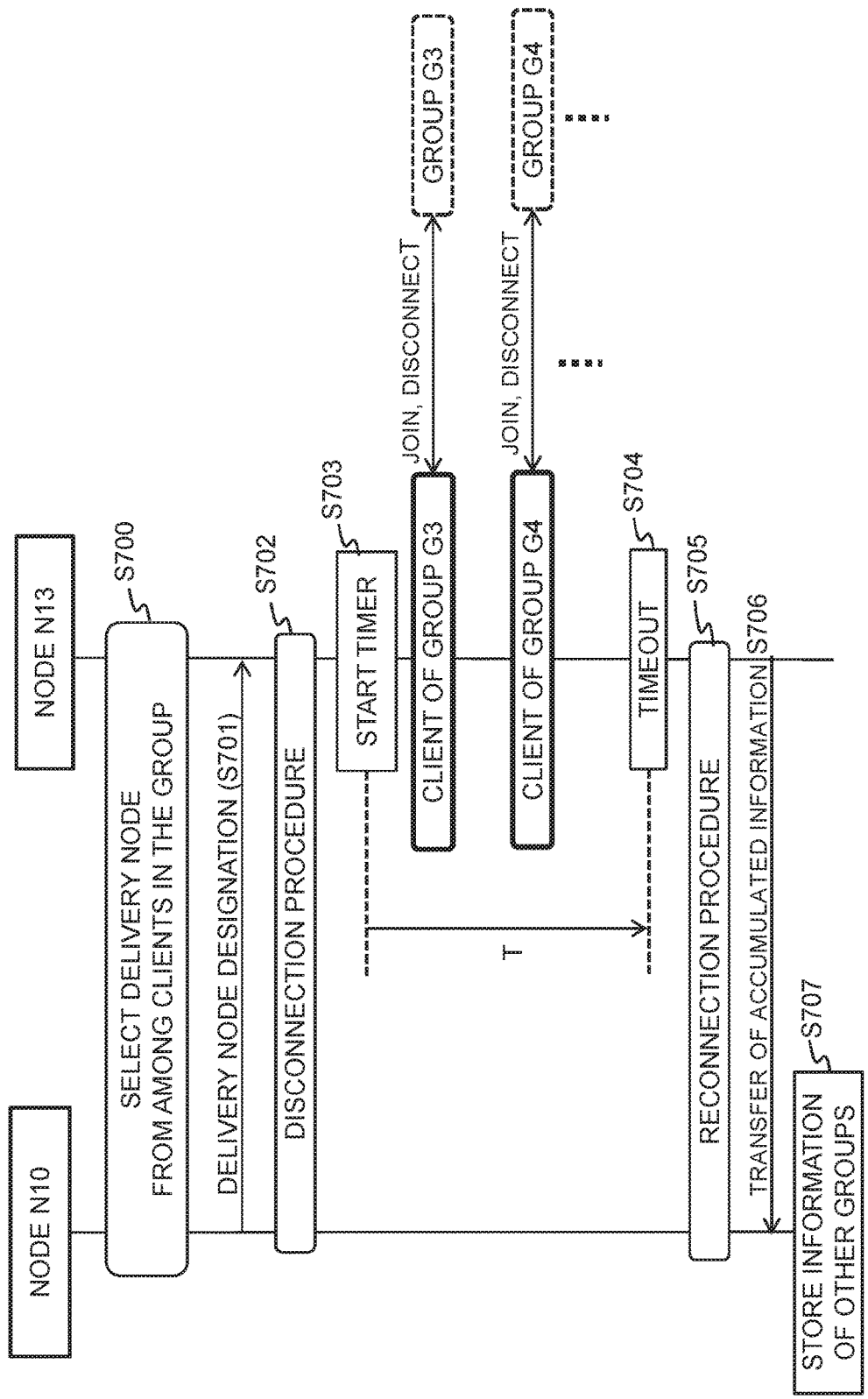
FIG. 10 is a sequence chart showing operation in the group-to-group communication system shown in FIG. 9.

Referring to FIG. 10, the GO node N10 of the group G1, as described in the second exemplary embodiment above, selects at least one delivery node among the client nodes N11 to N14 (Operation S700) and gives a disconnection instruction to each selected delivery node (Operation S701). Here, it is assumed that the node N13 is selected as a delivery node, as shown in FIG. 9. When the node N13 designated as a delivery node disconnects from the GO node N10 (Operation S702), the node N13 starts a timer on which a predetermined information delivery period is set (Operation S703) so that the node N13 will not return to the original group G1 before timeout. That is, the delivery node N13 sequentially performs information delivery to the discovered neighboring groups G3, G4 and G5 until timeout. In that event, it is also possible that the delivery node N13 joins the neighboring groups while referring to the delivery history and updates the delivery history after performing information transfer, as in the third exemplary embodiment.

When timeout of the timer occurs (Operation S704), the delivery node N13 returns to the original groups G1 after finishing information delivery to the neighboring groups (Operation S705) and transfers, to the GO node N10, the accumulated information that was acquired from each neighboring group when the delivery node N13 joined the neighboring group (Operation S706), and the information is stored in the information storage section 203 of the GO node N10 (Operation S707).

Note that the GO node N10 can also perform control such that the timer of a delivery node is not set. More specifically, if a delivery node should return to the original group, a timer is set for that delivery node, but otherwise a timer is not set. Alternatively, it is also possible that the control section 205 of a delivery node determines whether or not to set its own return timer. For example, if a group setting application that is the same as that of the GO node N10 is activated, which will be described later, the return timer is set, but if not, the timer is not set.

Moreover, the information delivery operation of the delivery node N13 is managed by using a timer in the present exemplary embodiment, but can be also managed by using the number of neighboring groups to which delivery is to be made. For example, it is also possible that the number of neighboring groups to which delivery is to be made is designated, and a delivery node returns after connecting to the designated number of neighboring groups. Alternatively, it is also possible to manage a delivery node so as not to return until the delivery node connects to the designated number of neighboring groups.

4.3) Effects

As described above, according to the fourth exemplary embodiment of the present invention, in addition to the above-described effects of the first to third exemplary embodiments, a time period from a delivery node's leaving the original group until its return thereto, or the number of neighboring groups to which a delivery node should connect, is set, whereby it is possible to increase the reliability of information delivery by the delivery node, and to ensure the return of the delivery node that should return.

5. FIFTH EXEMPLARY EMBODIMENT

According to a fifth exemplary embodiment of the present invention, an application group is formed at a higher layer than groups, and rules for the disconnection and joining operation of a delivery node are set within this higher-layer application group.

Referring to FIG. 11, in a system according to the present exemplary embodiment, it is assumed that a plurality of nodes form three groups G1 to G3, and that the node N10 is the parent (group owner) of the group G1 with the nodes N11 to N13 as its clients and the node N14 is the parent (group owner) of the group G2 with the nodes N15 to N17 as its clients. Further, it is assumed that a predetermined application is set on the nodes N10 to N16, which form an application group Gap, and that the node N17 and the group G3 do not belong to the application group Gap.

An application group is manually input by a user, and therefore, in some cases, the number of members of such a group exceeds a predetermined limit of the number of members of a group. Accordingly, if communication between groups as described above is possible, a higher-layer group can be configured beyond the limit of the number of members of a group. In this case, rules for rearrangement of nodes between groups can be determined in accordance with a constraint of an application by which an application group Gap is configured. For example, the nodes N10 to N16 registered with the higher-layer application group are controlled so that they can mutually move in and out the groups and, even when designated as a delivery node, will be subject to timer setting so as to return after a certain period of time, but the other node N17 is controlled so that a timer will not be set on it (or it will not be designated as a delivery node to begin with).

As described above, according to the fifth exemplary embodiment of the present invention, a user sets a constraint of an application in a higher-layer application group including a plurality of groups, whereby rules for a node's disconnecting from a group, joining a group, and moving between groups can be set as the user desires.

6. SIXTH EXEMPLARY EMBODIMENT

As described above, a delivery node can return to the original group after delivering information to neighboring groups. However, the present invention is not limited to such scenarios. In case of spreading emergency information in particular, priority can be placed on transferring information to as many neighboring groups as possible as in a sixth exemplary embodiment of the present invention, which will be described below.

Referring to FIG. 12, in a system according to the present exemplary embodiment, it is assumed that a plurality of nodes N10 to N19 form four groups G1 to G4. It is assumed that the node N10 is the parent (group owner) of the group G1 with the nodes N11 to N13 as its clients, the node N14 is the parent (group owner) of the group G2 with the nodes N15 to N17 as its clients, and further the nodes N18 and N19 are the group owners of the groups G3 and G4, respectively.

Note that it is assumed that the GO node of each group operates in such a manner that it temporarily disconnects a relatively low-priority client node in its group and preferentially accepts a delivery node, in order to increase the chance of a delivery node's joining. It is also possible to keep the number of members of each group always smaller than the upper limit in the system as described above. Hereinafter, a case will be described as an example where a message MSG1 shared within the group G1 is delivered to the other groups.

Referring to FIG. 13, in the group G1, one or more client nodes become delivery nodes (Operation S801). Here, it is assumed that one client node N12 in the group G1 becomes a delivery node.

The node N12 as a delivery node disconnects from the GO node N10 and joins the GO node N14 of the neighboring group G2 as described above, and thereby transfers the message MSG1 to the GO node N14 of the group G2 (Operation S802). Since the delivery node N12 can preferentially join, information delivery from the delivery node N12 succeeds with a high probability.

When delivery of the message MSG1 to the GO node N14 is finished and sharing of the message MSG1 in the group G2 is completed, then the GO node N14 of the group G2 next selects one or more client nodes in the group G2 as delivery nodes (Operation S803). Here, it is assumed that two client nodes N16 and N17 in the group G2 become delivery nodes.

The nodes N16 and N17 as delivery nodes each disconnect from the GO node N14 as described above, join the neighboring groups G3 and G4, respectively, and thereby deliver the message MSG1 to the groups G3 and G4, respectively (Operation S804). Thereafter, information delivery is repeated similarly in downstream groups, whereby the same information MSG1 is spread quickly in the P2P network over a wide range.

7. EXAMPLE

Next, a detailed description will be given of a case as an example of the present invention where the above-described systems according to the first to sixth exemplary embodiments of the present invention are applied to a Wi-Fi Direct-compliant P2P network. Since basic configurational components and functions are as described above, illustrated below is a case where such configurational components and functions are implemented based on Wi-Fi Direct.

7.1) Node Configuration

Referring to FIG. 14, a node (wireless terminal) according to the present example includes a Wi-Fi device 901 for performing Wi-Fi communication, a Wi-Fi connection control section 902, an application section 903, and a WFD automatic connection control section 904 that performs automatic connection in accordance with Wi-Fi Direct. Here, the WFD automatic connection control section 904 corresponds to the user control section 202 in FIG. 3. Note that the information storage section 203 described in FIG. 3 is not shown in FIG. 14 but is provided to the node in the present example.

In the node according to the present example, the WFD automatic connection control section 904 controls Wi-Fi Direct commands on behalf of an existing communication application. Accordingly, it is possible to automate the control according to Wi-Fi Direct, without modifying the existing application. For example, when wireless terminals come close to each other, they can automatically form a group and implement terminal-to-terminal communication within the group. Moreover, when a new terminal approaches an already established group, the terminal can automatically join the established group. Further, even if already established groups are in proximity to each other, the composition of each group is maintained without changing.

7.2) Wi-Fi Direct Connection and Disconnection Flows

Referring to FIG. 15, in case of forming a group between terminals (CASE 1), first, a node searches for a P2P node in its vicinity through Device Discovery processing, and when a P2P node is discovered, the nodes connect to each other through GO Negotiation processing, with one of them becoming the group owner (GO) and the other becoming a client. Subsequently, WPS Provision Phase-1 (authentication phase) and Phase-2 (encryption phase) are sequentially performed.

In case of connecting to an existing GO (CASE 2), first, a node searches for a P2P node in its vicinity through Device Discovery processing, and if a discovered P2P node is a GO, the node connects to this GO through Provision Discovery processing. Subsequently, WPS Provision Phase-1 (authentication phase) and Phase-2 (encryption phase) are sequentially performed.

In case of connecting to a Persistent GO (CASE 3), first, a node searches for a P2P node in its vicinity through Device Discovery processing, and if a discovered P2P node is a Persistent GO, the node connects to this Persistent GO through Invitation processing. Subsequently, WPS Provision Phase-1 (authentication phase) and Phase-2 (encryption phase) are sequentially performed.

The Device Discovery operation is performed as illustrated in FIG. 16. That is, the Wi-Fi connection control section of each node, upon receiving a search request from the WFD automatic connection control section, starts searching for a neighboring node and repeats Search state and Listen state alternately. In Search state, the node sends out Probe Request while sequentially changing predetermined channels and waits for a response, Probe Response, thereto. In Listen state, the node waits for Probe Request from another node and, when receiving Probe Request, returns a response, Probe Response, thereto. Assuming that a node N1 is a client of a group, the Wi-Fi connection control section of the node N1, when receiving Probe Response from a node N2, notifies information on this neighboring node N2 as neighboring node information to the group owner of its own group.

The Device Discovery operation toward an existing GO is performed as illustrated in FIG. 17. If a group is already established with a node N2 as its group owner, the GO node N2 returns Probe Response to Probe Request from a node N1. At that time, P2P Device Info Attribute in the Probe Response from the GO node N2 contains a list of clients belonging to this group (here, information on the node N2 and a node N3).

The GO Negotiation operation in case of forming a group between terminals is performed as illustrated in FIG. 18. GO Negotiation Request, GO Negotiation Response, and GO Negotiation Confirmation are sent and received between nodes, whereby one of the nodes becomes a GO and starts broadcasting a beacon.

The Provision Discovery operation for connecting to an existing GO is performed as illustrated in FIG. 19. In response to Provision Discovery Request from a node N1 to a node N2, the GO node N2 returns Provision Discovery Response to the node N1, whereby the node N1 is connected to the node N2.

The Invitation operation for connecting to a Persistent-GO is performed as illustrated in FIG. 20. In response to Invitation Request from a node N1 to a node N2, the Persistent-GO node N2 returns Invitation Response to the node N1, whereby the node N1 is connected to the node N2.

Figure 21A:
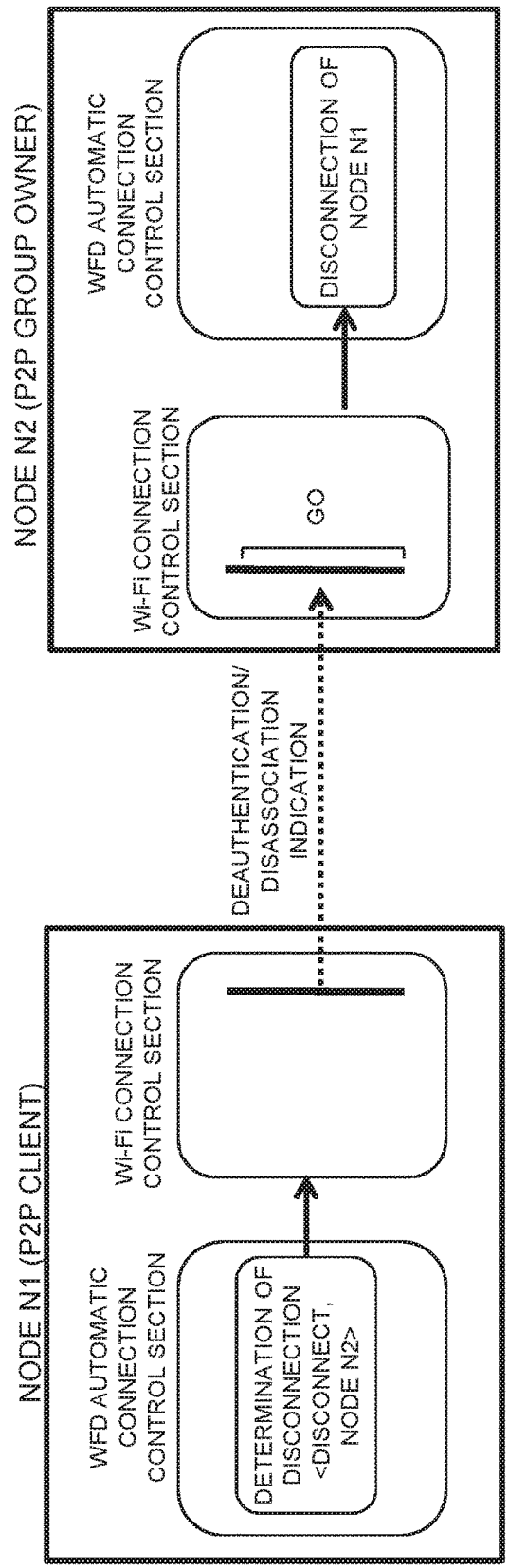
FIG. 21A is a schematic sequence chart showing operation of client-led disconnection from a group in the present example.
Figure 21B:
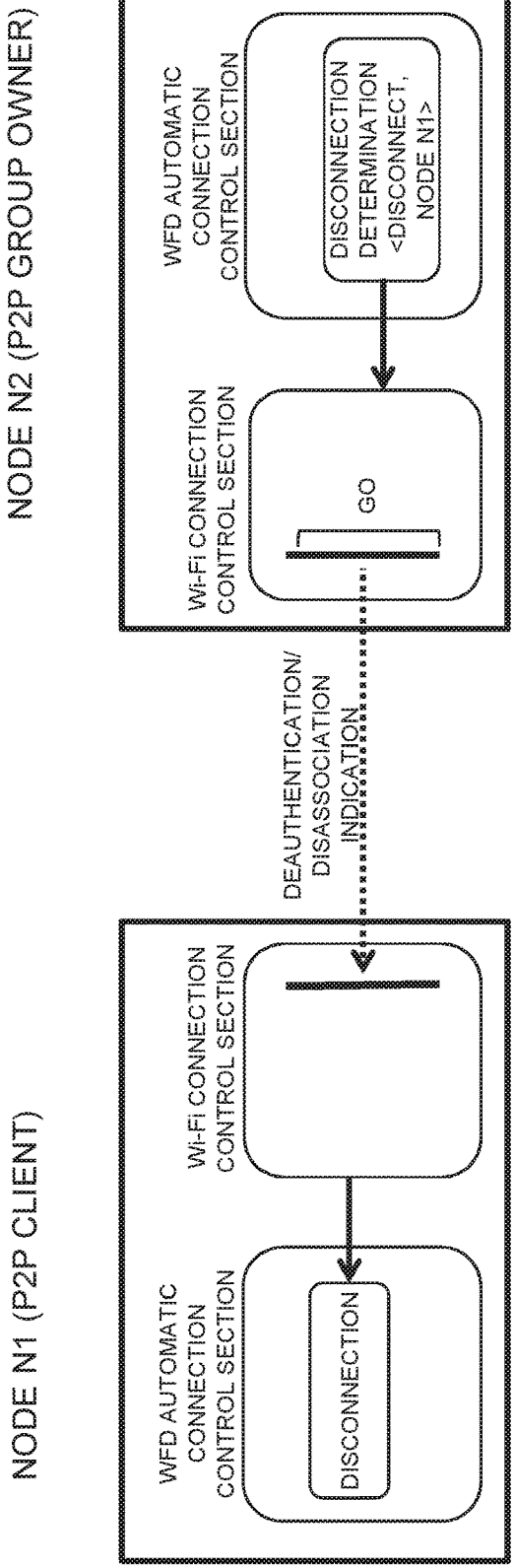
FIG. 21B is a schematic sequence chart showing operation of group owner-led disconnection from a group in the present example.

Referring to FIG. 21A, in client-led disconnection, a client node N1 sends Deauthentication or Disassociation Indication to a GO node N2 and thereby can disconnect therefrom. Conversely, referring to FIG. 21B, in group owner-led disconnection, the GO node N2 sends Deauthentication or Disassociation Indication to the client node N1 and thereby can disconnect the client.

Through the above-described Wi-Fi connection and disconnection flows, the above-described information sharing methods according to the first to sixth exemplary embodiments of the present invention can be implemented in a Wi-Fi P2P network.

INDUSTRIAL APPLICABILITY

The present invention can be implemented in a P2P network including a plurality of nodes (wireless terminals) that can dynamically form a group.

REFERENCE SIGNS LIST

G1-G5 Group
GO Group owner
N Node
MSG Message
201 Wireless communication section
202 User control section
203 Information storage section
204 Program storage section
205 Control section
301-304 Probe response, beacon

The invention claimed is:

1. A communication method in a wireless communication network including a plurality of nodes that can form a peer-to-peer group, comprising:
at an owner node operating as an access point in a first group, selecting one or a plurality of client nodes in the first group as delivery nodes;
at the delivery node, disconnecting from the first group and connects to a second group that is present in vicinity to the delivery node; and
transferring information between the delivery node and an owner node of the second group.

2. The communication method according to claim 1, wherein the delivery node is selected based on a number of neighboring groups or a number of neighboring nodes discovered by each client node.

3. The communication method according to claim 1, wherein the delivery node is selected based on a distance from the owner node of the first group.

4. The communication method according to claim 1, wherein the delivery node keeps a history of groups the delivery node joined in the past, and refers to the history when joining another group.

5. The communication method according to claim 1, wherein the delivery node transfers information shared in the first group to the owner node of the second group.

6. The communication method according to claim 1, wherein when information transfer between the delivery node and the owner node of the second group is finished, the delivery node disconnects from the second group and reconnects to the first group.

7. The communication method according to claim 6, wherein the delivery node periodically performs disconnection from the first group.

8. The communication method according to claim 6, wherein the delivery node includes a timer for a predetermined period of time that starts when the delivery node disconnects from the first group, and does not reconnect to the first group until timeout of the timer occurs.

9. The communication method according to claim 8, wherein the delivery node sequentially connects to groups that are present in vicinity to the delivery node until timeout of the timer occurs, and returns to the first group after timeout occurs.

10. The communication method according to claim 6, wherein after disconnecting from the first group, the delivery node does not reconnect to the first group until the delivery node connects to a predetermined number of groups.

11. The communication method according to claim 10, wherein the delivery node returns to the first group after connecting to the predetermined number of groups.

12. The communication method according to claim 6, wherein the delivery node transfers information shared in the second group to the owner node of the first group.

13. The communication method according to claim 1, wherein when the plurality of nodes operate based on an application, a higher-layer group including a plurality of groups is formed based on the application, and a belonging relationship of nodes within the plurality of groups is determined based on a constraint of the application.

14. A communication system in a wireless communication network including a plurality of nodes that can form a peer-to-peer group, wherein
an owner node operating as an access point in a first group selects one or a plurality of client nodes within the first group as delivery nodes,
the delivery node disconnects from the first group and connects to a second group that is present in vicinity to the delivery node, and
information is transferred between the delivery node and an owner node of the second group.

15. A wireless terminal that can form a peer-to-peer group with another wireless terminal in a wireless communication network, comprising:
a first controller configured to operate the wireless terminal as either an access point or a client node of a first group;
a second controller configured to, when the wireless terminal operating as the client node of the first group and being designated as a delivery node from an owner node of the first group, disconnect from the first group;
connect to an owner node of a second group that is present in vicinity;
transfer information with the owner node of the second group; and
store information of the second group.

16. The wireless terminal according to claim 15, wherein the second controller is configured to, when the wireless terminal operating as the access point of the first group,
select one or a plurality of wireless terminals within the first group as delivery nodes; and
disconnect the delivery node from the first group.

17. The wireless terminal according to claim 15, wherein the second controller is configured to keep a history of groups joined in the past, and refer to the history when joining another group.

18. The wireless terminal according to claim 15, wherein the second controller includes a timer for a predetermined period of time that starts when disconnecting from the first group, wherein the second controller is configured not to reconnect to the first group until timeout of the timer occurs.

19. A communication control method for a wireless terminal that can form a peer-to-peer group with another wireless terminal in a wireless communication network, comprising:
when the wireless terminal operating as a client node of the first group and being designated as a delivery node from an owner node of the first group,
disconnecting from the first group;
connecting to an owner node of a second group that is present in vicinity;
transferring information with the owner node of the second group; and
storing information of the second group.

20. The communication control method according to claim 19, wherein, when the wireless terminal operating as the access point of the first group,
selecting one or a plurality of wireless terminals within the first group as delivery nodes; and
disconnecting the delivery node from the first group.

* * * * *